US012595215B2

(12) United States Patent
Cong et al.

(10) Patent No.: US 12,595,215 B2
(45) Date of Patent: Apr. 7, 2026

(54) METHODS OF MAKING HONEYCOMB BODIES HAVING INORGANIC FILTRATION DEPOSITS

(71) Applicant: CORNING INCORPORATED, Corning, NY (US)

(72) Inventors: Pei Cong, Shanghai (CN); Cai Liu, Suzhou (CN); Huiqing Wu, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 81 days.

(21) Appl. No.: 18/716,241

(22) PCT Filed: Dec. 17, 2021

(86) PCT No.: PCT/CN2021/139008
§ 371 (c)(1),
(2) Date: Jun. 4, 2024

(87) PCT Pub. No.: WO2023/108589
PCT Pub. Date: Jun. 22, 2023

(65) Prior Publication Data
US 2025/0034052 A1      Jan. 30, 2025

(51) Int. Cl.
*C04B 38/00* (2006.01)
*B01D 46/00* (2022.01)
(Continued)

(52) U.S. Cl.
CPC ...... *C04B 38/0096* (2013.01); *B01D 46/0001* (2013.01); *B01D 46/2418* (2013.01);
(Continued)

(58) Field of Classification Search
CPC . C04B 41/84; C04B 41/4961; C04B 41/4543; C04B 38/0006; C04B 38/0096;
(Continued)

(56) References Cited

U.S. PATENT DOCUMENTS

| 7,520,918 B2 | 4/2009 | Zoeller, III |
| 8,327,666 B2 | 12/2012 | Harvey et al. |

(Continued)

FOREIGN PATENT DOCUMENTS

| JP | 2005074298 A | * | 3/2005 |
| WO | WO-2020047503 A2 | * | 3/2020 | ........... C04B 35/195 |

OTHER PUBLICATIONS

Tandon et al., "Measurement and prediction of filtration efficiency evolution of soot loaded diesel particulate filters", Chemical Engineering Science vol. 65, Issue 16, Aug. 15, 2010, pp. 4751-4760.

*Primary Examiner* — Nathan H Empie
(74) *Attorney, Agent, or Firm* — Kevin M. Able

(57) ABSTRACT

Methods for applying a surface treatment to a plugged honeycomb body comprising porous wall includes: atomizing particles of an inorganic material into liquid-particulate-binder-adhesion promoter droplets comprised of an aqueous vehicle, an alkali-free binder and an adhesion promoter, and the particles, evaporating substantially all of the aqueous vehicle from the droplets to form agglomerates comprised of the particles and the alkali-free binder and the adhesion promoter, and depositing the agglomerates onto the porous walls of the plugged honeycomb body, wherein the agglomerates are disposed on, or in, or both on and in, the porous walls. Plugged honeycomb bodies comprising porous walls and inorganic material deposited thereon are also disclosed.

23 Claims, 16 Drawing Sheets

(51) Int. Cl.

| | |
|---|---|
| *B01D 46/24* | (2006.01) |
| *C04B 41/45* | (2006.01) |
| *C04B 41/49* | (2006.01) |
| *C04B 41/84* | (2006.01) |

(52) U.S. Cl.
CPC ...... *C04B 38/0006* (2013.01); *C04B 41/4543* (2013.01); *C04B 41/4961* (2013.01); *C04B 41/84* (2013.01); *B01D 2279/30* (2013.01)

(58) Field of Classification Search
CPC ............ B01D 2279/30; B01D 46/0001; B01D 46/2418
See application file for complete search history.

(56) References Cited

U.S. PATENT DOCUMENTS

| | | | |
|---|---|---|---|
| 8,495,968 | B2 | 7/2013 | Tsuji et al. |
| 8,534,221 | B2 | 9/2013 | Tsuji et al. |
| 8,632,852 | B2 | 1/2014 | Tsuji et al. |
| 8,959,773 | B2 | 2/2015 | Fekety et al. |
| 9,352,277 | B2 | 5/2016 | Sutton et al. |
| 11,898,475 | B2 | 2/2024 | Boyuk et al. |
| 2018/0311621 | A1 | 11/2018 | Chen et al. |
| 2021/0197105 | A1 | 7/2021 | Gu et al. |
| 2021/0205750 | A1 | 7/2021 | Liu et al. |
| 2021/0347702 | A1 | 11/2021 | Citriniti et al. |

* cited by examiner

METHODS OF MAKING HONEYCOMB BODIES HAVING INORGANIC FILTRATION DEPOSITS

This application claims the benefit of priority under 35 U.S.C. § 365 of International Patent Application Serial No. PCT/CN2021/139008, filed on Dec. 17, 2021, the content of which is relied upon and incorporated herein by reference in its entirety.

BACKGROUND

Field

The present specification relates to methods of making porous bodies, such as porous ceramic honeycomb bodies, which comprise inorganic deposits, the deposits comprised of an inorganic filtration material.

Technical Background

Wall-flow filters are employed to remove particulates from fluid exhaust streams, such as from combustion engine exhaust. Examples include diesel particulate filters used to remove particulates from diesel engine exhaust gases and gasoline particulate filters (GPF) used to remove particulates from gasoline engine exhaust gases. Exhaust gas to be filtered enters inlet cells and passes through the cell walls to exit the filter via outlet channels, with the particulates being trapped on or within the inlet cell walls as the gas traverses and then exits the filter.

Methods of applying inorganic deposits to honeycomb filter bodies may include the formation of an aerosol comprising a mixture of particulate, a binder and an aqueous vehicle, and depositing particulate-binder-adhesion promoter agglomerates formed by the aerosol onto the porous walls of a honeycomb filter body. There is a need to provide improved processes for applying inorganic deposits to honeycomb filter bodies using aqueous vehicles.

SUMMARY

Aspects of the disclosure pertain to porous bodies and methods for their manufacture and use.

In one aspect, a method is disclosed herein for applying inorganic deposits to a honeycomb filter body, such as a plugged honeycomb filter body, the filter body comprising porous walls, the method comprising: atomizing a feed mixture into liquid-particulate-binder-adhesion promoter droplets, the feed mixture being comprised of an aqueous vehicle, a binder and an adhesion promoter, and particles of an inorganic material; aerosolizing the liquid-particulate-binder-adhesion promoter droplets, with, for example, a gaseous carrier stream; removing, e.g. evaporating, substantially all of the aqueous vehicle from the droplets to form aerosolized particulate-binder-adhesion promoter agglomerates comprised of the particles and the binder comprises silicon and the adhesion promoter comprises an alkylalkoxysiloxane; directing the aerosolized agglomerates onto the porous walls of the honeycomb filter body, thereby depositing the agglomerates on, or in, or both on and in, the porous walls. In specific embodiments, the method further comprises heating the honeycomb filter body containing the agglomerates for a time and at a temperature sufficient to cause the binder to bind the agglomerates to the porous walls, or to bind at least some of the agglomerates to each other, or both. In some embodiments, the method further comprises heating the honeycomb filter body containing the agglomerates for a time and at a temperature sufficient to cause the binder to break down. In some embodiments, the binder comprises silicon, and the method further comprises heating the honeycomb filter body containing the agglomerates for a time and at a temperature sufficient to form silica from the binder. In one or more embodiments, the binder is a silicon-containing compound. In one or more embodiments, the silicon-containing compound is comprised of a siloxane or polysiloxane, silicone, a silicate, or a combination thereof. In one or more embodiments, the silicon-containing compound is comprised of a silicone compound, polysiloxane, silicone resin, siloxane, alkoxysiloxane, or combinations thereof. In one or more embodiments, the silicon-containing compound is comprised of a silicate, an alkaline silicate, a sodium silicate, or combinations thereof.

In another aspect, a method is disclosed herein for making a honeycomb filtration body which comprises: mixing together particles of an inorganic material with an aqueous vehicle and a binder and an adhesion promoter to form a liquid-particulate-binder-adhesion promoter mixture, for example, a suspension, or a colloid; atomizing the liquid-particulate-binder-adhesion promoter mixture with an atomizing gas to form liquid-particulate-binder-adhesion promoter droplets comprised of the aqueous vehicle, the binder and the adhesion promoter, and the particles, by, for example, directing the liquid-particulate-binder-adhesion promoter mixture into an atomizing nozzle and atomizing with a forced atomizing gas; aerosolizing the droplets with a gaseous carrier stream and conveying the droplets toward the honeycomb body with a carrier gas flow through a duct close coupled with the honeycomb filter body, the carrier gas flow comprising the gaseous carrier stream. In one or more embodiments, the duct has an outlet end proximate the honeycomb filter body, wherein an internal surface of the duct defines a chamber. In one or more embodiments, the carrier gas flow further comprises the atomizing gas. The method further comprises evaporating substantially all of the aqueous vehicle from the aerosolized droplets to form aerosolized particulate-binder-adhesion promoter agglomerates comprised of the particles and the binder and the adhesion promoter and depositing the agglomerates onto the porous walls of the honeycomb filter body. In one or more embodiments, the deposited agglomerates are disposed on, or in, or both on and in, the porous walls. In one or more embodiments, the carrier gas flow further comprises a vapor phase of the aqueous vehicle. In one or more embodiments, the carrier gas flow passes through the walls of the honeycomb filter body while the agglomerates are being deposited onto the porous walls of the honeycomb filter body by the atomizing gas.

In one or more embodiments, the carrier gas stream is delivered to the chamber of the duct in an annular flow surrounding the atomizing nozzle in a co-flow around droplets exiting the nozzle. In one or more embodiments, substantially all of the aqueous vehicle is evaporated from the droplets to form aerosolized particulate-binder-adhesion promoter agglomerates comprised of the particles and the binder and the adhesion promoter; aerosolized aggregates of particulate-binder-adhesion promoter agglomerates are made; and the aggregates and individual, for example, non-aggregated, agglomerates are deposited onto the porous walls of the honeycomb filter body. In one or more embodiments, the deposited aggregates and agglomerates are disposed on, or in, or both on and in, the porous walls. In one or more embodiments, during the depositing, the duct is in sealed fluid communication with the honeycomb filter body.

Additional features and advantages will be set forth in the detailed description, which follows, and in part will be readily apparent to those skilled in the art from that description or recognized by practicing the embodiments described herein, comprising the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
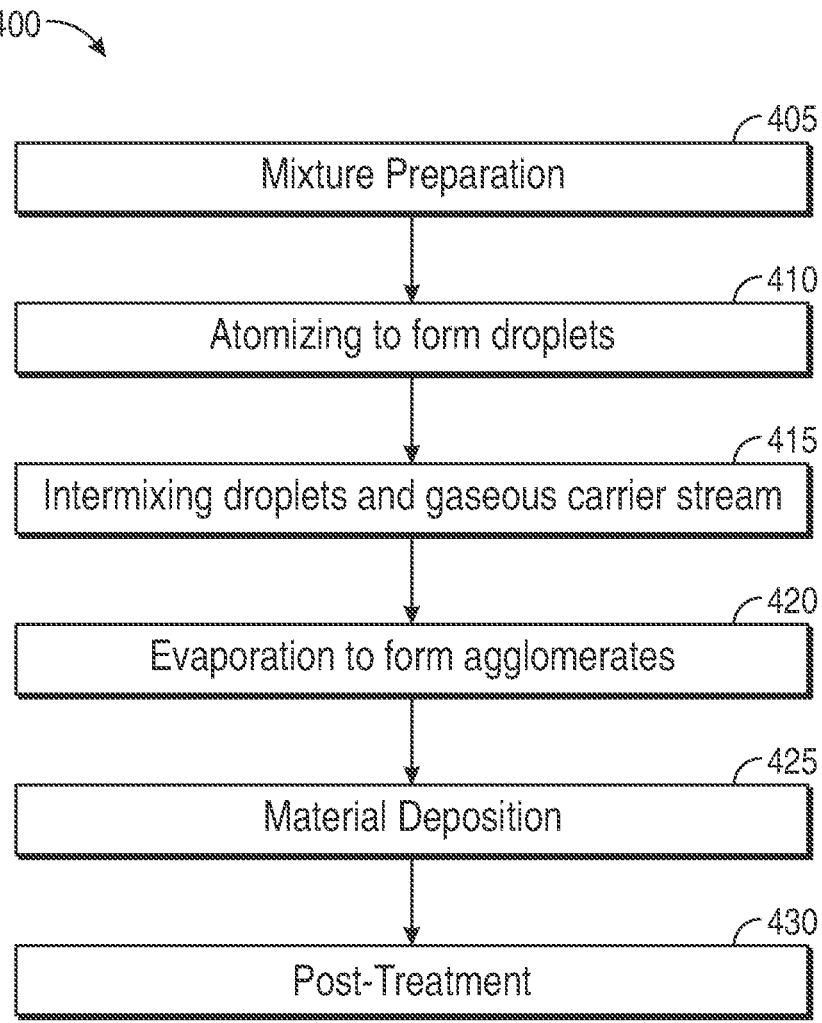
FIG. 1 is a flowchart depicting an exemplary embodiment of a process of forming material according to embodiments disclosed herein.

Reference will now be made in detail to embodiments of methods for forming honeycomb bodies comprising a porous honeycomb body comprising inorganic deposits (or "filtration deposits") on, or in, or both on and in, the porous ceramic walls of the honeycomb body matrix, embodiments of which are illustrated in the accompanying drawings. Filtration deposits comprise material that was deposited into the honeycomb body, as well as compounds that may be formed, for example, by heating, from one or materials that were originally deposited. For example, a binder such as an alkali-free binder and an adhesion promoter may be transformed by heating into an organic component which is eventually burned off or volatilized, while an inorganic component (such as silica) remains contained within the honeycomb filter body. Whenever possible, the same reference numerals will be used throughout the drawings to refer to the same or like parts.

Definitions

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to".

A "honeycomb body," as referred to herein, comprises a ceramic honeycomb structure of a matrix of intersecting walls that form cells which define channels. The ceramic honeycomb structure can be formed, extruded, or molded from a plasticized ceramic or ceramic-forming batch mixture or paste. A honeycomb body may comprise an outer peripheral wall, or skin, which was either extruded along with the matrix of walls or applied after the extrusion of the matrix. For example, a honeycomb body can be a plugged ceramic honeycomb structure which forms a filter body comprised of cordierite or other suitable ceramic material. A plugged honeycomb body has one or more channels plugged at one, or both ends of the body.

A honeycomb body disclosed herein comprises a ceramic honeycomb structure comprising at least one wall carrying one or more filtration material deposits which is configured to filter particulate matter from a gas stream. The filtration material deposits can be in discrete regions or in some portions or some embodiments can form one or more layers of filtration material at a given location on the wall of the honeycomb body. The filtration material deposits according to some embodiments comprise inorganic material, in some embodiments organic material, and in some embodiments both inorganic material and organic material. For example, a honeycomb body may, in one or more embodiments, be formed from cordierite or other porous ceramic material and further comprise inorganic material deposits disposed on or below wall surfaces of the cordierite honeycomb structure.

In some embodiments, the filtration material comprises one or more inorganic materials, such as one or more ceramic or refractory materials.

As used herein, "green" or "green ceramic" are used interchangeably and refer to an unsintered or unfired material, unless otherwise specified.

Methods

Aspects of the disclosure pertain to methods of forming porous bodies, such as porous ceramic honeycomb bodies, comprising a material such as a filtration material such as an inorganic material such as a ceramic or refractory material or even a porous ceramic or refractory material. In specific embodiments, the filtration material is an aerosol-deposited filtration material. In some preferred embodiments, the filtration material comprises a plurality of inorganic particle agglomerates, wherein the agglomerates are comprised of inorganic, such as ceramic or refractory, material. In some embodiments, the agglomerates are porous, which may allow gas to flow through the agglomerates.

Aerosol deposition enables deposition of filtration material onto the porous ceramic walls, which can be discrete regions as small as a single agglomerate or larger such as a plurality of agglomerates, and in some embodiments is in the form of a porous layer of filtration material, on or in, or both on and in, at least some surfaces of the walls of the ceramic honeycomb body. In certain embodiments, an advantage of the aerosol deposition method according to one or more embodiments is that ceramic honeycomb bodies with enhanced filtration performance can be produced economically, and/or more efficiently.

In certain embodiments, an aerosol deposition process disclosed herein comprises: mixture preparation (e.g., inorganic material, liquid vehicle, and a binder (in specific embodiments, an alkali-free binder) and adhesion promoter), atomizing the mixture with an atomizing gas with a nozzle to form agglomerates and/or aggregates, comprised of the inorganic material, the aqueous vehicle, and the binder and the adhesion promoter, drying the agglomerates and/or aggregates in the presence of a carrier gas or a gaseous carrier stream, depositing the aggregates and/or agglomerates onto the honeycomb bodies, and optionally curing the material. In some embodiments, walls of the apparatus can be heated to assist in drying the aggregates and/or agglomerates.

Future generation wall flow filters such as gasoline particulate filters may require more stringent processing, for example, materials that are free from sodium. Some aqueous processes utilize sodium-containing binders such as sodium silicate, and the presence of sodium in the GPF product may be problematic in the presence of three-way catalyst materials. In one or more embodiments of the disclosure, an aqueous based process is provided that does not utilize a alkali-containing (e.g., a sodium-containing) binder and utilizes an adhesion promoter in the aerosol deposition process. In one exemplary embodiment, binder comprises, consists essentially of or consists of an alkylalkoxysilane having the formula $(C_2H_4O)R^1OR^2Si(OR^3)_3$, where $R^1$ and $R^2$ independently comprise a $C_1$-$C_{12}$ substituted or unsubstituted alkyl, and $R^3$ comprises a $C_1$-$C_5$ unsubstituted alkyl. In one or more embodiments, the binder comprises, consists essentially of or consists of epoxy alkylalkoxysilane, more particularly, an epoxy alkyltrialkoxysilane, and an adhesion promoter. In one or more embodiments, the adhesion promoter comprises, consists essentially of or consists of a material selected from the group consisting of (γ-Glycidoxypropyl)trimethoxysilane, (3-Glycidoxybutyl)trimethoxysilane, (3-Glycidoxyethyl)trimethoxysilane, and 3-GlycidoxyHexadecyltrimethoxysilane. In one or more embodiments, the alkoxysilane adhesion promoter exhibits one or more of epoxy reactivity, methoxysilyl inorganic reactivity. Suitable ranges for the adhesion promoter include 0.5-4 wt % of the final mixture.

In one or more specific embodiments, instead of an alkali-containing, for example, a sodium-containing binder, the aerosol comprises an alkali-free binder comprising silicon, for example, a reactive alkoxy-siloxane resin binder. An exemplary amount of alkali-free binder content is in the range of greater than or equal to 5% by weight to less than or equal to 25% by weight of the particle content. In an embodiment, the alkali-free binder content is 15 to 20% by weight ±1%.

According to one or more specific embodiments, an aqueous-based process is used to generate a thin porous inorganic layer on or in walls of honeycomb filters. The inorganic layer comprises inorganic agglomerates bound together and to the substrates by a siloxane alkali-free binder. Wall flow filters were produced exhibiting improved filtration efficiency, while maintaining minimal pressure drop penalty in the application of vehicle exhaust treatment. Specifically, the siloxane alkali-free binder was dispersed in the suspension by adding adhesion promoter. Curing temperature of the siloxane alkali-free binder was only 200° C. and did not need further high temperature treatment. In one or more specific embodiments, the use of an alkali-free binder exhibits better compatibility with three-way catalysts.

In one or more embodiments, a dispersant, for example, a polyethylene glycol (PEG), for example, a branched PEG having 3-10 PEG chains, for example a PEG with 9 PEG chains and a molar weight of 400 (PEG400) is used as a dispersant in the aqueous vehicle, particles, a binder, for example, an alkali-free binder, adhesion promoter mixture. In some embodiments, the addition of the adhesion promoter creates a hydrolysis balance with the adhesion promoter to be sufficiently disperse in aqueous-based suspension Benefiting from this process are, the filtration efficiency (FE) of GPF was increased from 20% cigarette smoke FE to 92% with about 5.5 g/L of loading of inorganic particles. A GPF was able to maintain its filtration efficiency in a high flow test, cold vibration test, fuel-cut vehicle test and water test, indicating great reliability of the inorganic layer. Furthermore, GPFs made with the binder and an adhesion promoter exhibited better soot loaded backpressure and less particulate emission in lab bench tests. Moreover, GPFs according to one or more embodiments exhibited acceptable pressure drop penalty (20%) compared to a bare GPF. In addition, a significant cost advantage over ethanol-based processes is realized, due to low cost of raw materials and no requirement for a specific pollution abatement system.

In various embodiments, the carrier gas can be heated in addition to, or rather than, heating walls of the apparatus, such that liquid vehicle can evaporate from the agglomerates faster, which in turn allows agglomerates to be generated more efficiently. A heated gaseous carrier stream carries both atomized droplets and the agglomerates formed through the apparatus and into the honeycomb body. In some embodiments, atomizing gas is heated, alone or in combination with heating the carrier gas. In some embodiments, co-flowing the aerosolized droplets and/or agglomerates and the gaseous carrier stream in substantially the same direction into a chamber of an apparatus may help to reduce material loss or overspray on walls of the apparatus. Furthermore, a convergent section can be added to the apparatus before the agglomerates enter the ceramic honeycomb body in order to help the gas flow and particle tracking to be more uniform across the apparatus. An inner diameter of the end of the convergent section can be slightly larger than an outer diameter of the ceramic honeycomb body outer diameter in order to reduce or eliminate boundary effects of non-uniform particle deposition.

In an atomizing nozzle, or atomizer, high pressure and/or high speed atomizing gas can be used to break-up the suspension, which contains a mixture of liquid vehicle, a binder, for example, an alkali-free binder, an adhesion promoter and solid particles, into small liquid droplets, for example with average droplet size of 4-6 micrometers. Heating of these liquid droplets and quick evaporation of the aqueous vehicle creates porous inorganic agglomerates before depositing on the honeycomb body walls as a porous inorganic feature or structure. In some embodiments more than one nozzle is utilized, even in some cases under the same operating conditions, such that the liquid flow through each nozzle is reduced and droplet sizes can be smaller.

According to one or more embodiments, a process is disclosed herein comprising forming an aerosol with a binder, for example, an alkali-free binder and an adhesion promoter, which is deposited on a honeycomb body to provide a high filtration efficiency material, which may be present in discrete regions and/or in some portions or some embodiments in an inorganic layer, on the honeycomb body to provide a particulate filter. According to one or more embodiments, the performance is >90% filtration efficiency with a <10% pressure drop penalty compared to a bare filter. According to one or more embodiments, as shown in FIG. 1, the process 400 comprises the steps of mixture preparation 405, atomizing to form droplets 410, intermixing droplets and a gaseous carrier stream 415; evaporating liquid vehicle to form agglomerates 420, depositing of material, e.g., agglomerates, on the walls of a wall-flow filter 425, and optional post-treatment 430 to, for example, bind the material on, or in, or both on and in, the porous walls of the honeycomb body. Aerosol deposition methods form of agglomerates comprising a binder and an adhesion promoter can provide a high mechanical integrity even without any high temperature curing steps (e.g., heating to temperatures in excess of 1000° C.), and in some embodiments even higher mechanical integrity after a curing step such as a high temperature (e.g., heating to temperatures in excess of 1000° C.) curing step. In the process in FIG. 1, the aerosol deposition forms inorganic material deposits, which in some specific embodiments are porous material deposits. In some embodiments, the material deposits are in the form of discrete regions of filtration material. In some embodiments, at least some portions of the material deposits may be in the form of a porous inorganic layer.

In various embodiments, the process further includes part-switching such that depositing of agglomerates onto the porous walls of a plugged honeycomb body is conducted semi-continuously or continuously, which reduces idle time of the equipment. In one or more embodiments, the part-switching is timed so that deposition is essentially continuous into and/or onto a plurality of ceramic honeycomb bodies. Reference to continuous means that the operating equipment is maintained under operating temperatures and pressures and raw material supply flow, and that the flow of the gaseous carrier stream and agglomerates into a part such as a wall-flow filter is interrupted only to switch out a loaded part for an unloaded part. Semi-continuous allows also for minor interruptions to the raw material supply flow and adjustments to operating temperatures and pressures. In one or more embodiments, semi-continuous flow means that flow is interrupted for greater than or equal to 0.1% to less than or equal to 5% of an operating duration, including greater than or equal to 0.5%, greater than or equal to 1%, greater than or equal to 1.5%, greater than or equal to 2%, greater than or equal to 2.5%, and/or less than or equal to 4.5%, less than or equal to 4%, less than or equal to 3.5%, less than or equal to 3%. In one or more embodiments, flow is continuous for greater than or equal to 95% to less than or equal to 100% of an operating duration, including greater than or equal to 96%, greater than or equal to 97%, greater than or equal to 98%, greater than or equal to 99%, greater than or equal to 99.5%, and/or less than or equal to 99.9%, less than or equal to 99%, less than or equal to 98%, less than or equal to 97%.

Mixture Preparation 405.

Commercially available inorganic particles can be used as a raw material in a mixture in the formation of an inorganic material for depositing. According to one or more embodiments, the particles are selected from $Al_2O_3$, $SiO_2$, $TiO_2$, $CeO_2$, $ZrO_2$, SiC, MgO and combinations thereof. In one or more embodiments, the mixture is a suspension. The particles may be supplied as a raw material suspended in an aqueous vehicle to which a further liquid vehicle is optionally added.

Thus, in some embodiments, the mixture is aqueous-based; for example, an aqueous vehicle of the suspension may be water. In one or more embodiments, the aqueous vehicle consists essentially of water.

In some embodiments, the suspension comprises by weight: 5-20% particles and 80-95% liquid, and all values and subranges therebetween. In an embodiment, the suspension comprises by weight: 11 percent±1% alumina and 89 percent±1% water.

In one or more embodiments, the particles have an average primary particle size in a range of from about 10 nm to 4 about microns, about 20 nm to about 3 microns or from about 50 nm to about 2 microns, or from about 50 nm to about 900 nm or from about 50 nm to about 600 nm. In specific embodiments, the average primary particle size is in a range of from about 100 nm to about 200 nm, for example, 150 nm. The average primary particle size can be determined as a calculated value from the BET surface area of the aerosol particles, which in some embodiments is 10 $m^2/g$ currently.

In one or more embodiments, the primary particles comprise a ceramic particle, such as an oxide particle, for example $Al_2O_3$, $SiO_2$, MgO, $CeO_2$, $ZrO_2$, CaO, $TiO_2$, cordierite, mullite, SiC, aluminum titanate, and mixture thereof.

The mixture is formed using a solvent which is added to dilute the suspension if needed. Decreasing the solids content in the mixture could reduce the aggregate size proportionally if the droplet generated by atomizing has similar size. The solvent should be miscible with suspension mentioned above, and be a solvent for binder and other ingredients.

Binder and adhesion promoter optionally added to reinforce the agglomerates and to provide a stickiness or tackiness, and can comprise inorganic binder, to provide mechanical integrity to deposited material. In some specific embodiments, an alkali-free binder can provide binding strength between particles at elevated temperature (>500° C.). The starting material can be organic. After exposure to high temperature in excess of about 150° C., the organic starting material will decompose or react with moisture and oxygen in the air, and the final deposited material composition could comprise $Al_2O_3$, $SiO_2$, $MgO$, $CeO_2$, $ZrO_2$, $CaO$, $TiO_2$, cordierite, mullite, SiC, aluminum titanate, and mixture thereof. An exemplary alkali-free binder content is in the range of greater than or equal to 5% by weight to less than or equal to 25% by weight of the particle content. In an embodiment, the alkali-free binder content is 15 to 20% by weight ±1%.

Catalyst can be added to accelerate the cure reaction of binder. An exemplary catalyst used to accelerate the cure reaction of the alkali-free binder is titanium butoxide. An exemplary catalyst content is 1% by weight of the binder.

Stirring of the mixture or suspension during storage and/or awaiting delivery to the nozzle may be conducted by using desired stirring techniques. In one or more embodiments, stirring is conducted by a mechanical stirrer. In an embodiment, the use of a mechanical stirrer facilitates reduction and/or elimination of potential contaminations from plastic-coated mixing rods, which are in contact with a holding vessel, used in magnetic stirring systems.

Atomizing to form droplets 410. The mixture is atomized into fine droplets by high pressure gas through a nozzle. This setup is comprised of a nozzle body along with fluid cap 2050 and air cap 67147. The atomizing gas can contribute to breaking up the liquid-particulate-binder-adhesion promoter stream into the droplets.

In one or more embodiments, the nozzle herein is a nozzle that utilizes internal mixing, for example, internal mixing nozzles the part numbers are given above. In one or more embodiments, the nozzle herein is a nozzle that utilizes external mixing, for example, Spraying Systems external mix nozzle setup: 1/4J-SS+SU1A which is made up of a 64 aircap and a 1650 fluid cap. Another useful setup consists of a 64 aircap and a 1250 fluid cap. External mix nozzles can be advantageous to allow for smaller particle sizes with tighter particle size distribution which improves material utilization and filtration efficiency. External mix nozzles tend to clog less often as compared to internal mix nozzles. In one or more embodiments, the nozzles herein are converging nozzles. As used herein, converging nozzles refer to nozzles having fluid flow passages whose cross-sectional areas decrease from inlet to outlet thereby accelerating flow of the fluids. Converging nozzles may be internally mixed or externally mixed. In one or more embodiments, the liquid-particulate-binder-adhesion promoter droplets are directed into the chamber by a nozzle.

In one or more embodiments, the liquid-particulate-binder-adhesion promoter droplets are directed into the chamber by a plurality of nozzles. In one or more embodiments, atomizing the plurality of liquid-particulate-binder-adhesion promoter streams occurs with a plurality of atomizing nozzles. The plurality of nozzles may include 2 or more nozzles, 3 or more, 4 or more, 5 or more, 6 or more, 7 or more, 8 or more, 9 or more, 10 or more, and the like. The plurality of nozzles may be evenly spaced within the chamber. In one or more embodiments, each of the plurality of nozzles is angled toward a center of the apparatus. The angle of the nozzles may be acute, ranging from less than 900 to greater than 100 relative to a side wall of the apparatus, and all values and subranges therebetween, including 200 to 45°.

The pressure of the atomizing gas may be in the range of 20 psi to 150 psi. The pressure of the liquid may be in the range of 1 to 100 psi. The average droplet size according to one or more embodiments may be in the range of from 1 micron to 40 microns, including for example, in a range of greater than or equal to 1 micron to less than or equal to 15 microns; greater than or equal to 2 microns to less than or equal to 8 microns; greater than or equal to 4 microns to less than or equal to 8 microns; and greater than or equal to 4 microns to less than or equal to 6 microns; and all values and subranges therebetween. The droplet size can be adjusted by adjusting the surface tension of the mixture, viscosity of the mixture, density of the mixture, gas flow rate, gas pressure, liquid flow rate, liquid pressure, and nozzle design. In one or more embodiments, the atomizing gas comprises nitrogen. In one or more embodiments, the atomizing gas may consist essentially of an inert gas. In one or more embodiments, the atomizing gas may is predominantly one or more inert gases. In one or more embodiments, the atomizing gas may is predominantly nitrogen gas. In one or more embodiments, the atomizing gas may is predominantly air. In one or more embodiments, the atomizing gas may consist essentially of nitrogen or air. In one or more embodiments, the atomizing gas may be dry. In one or more embodiments, the atomizing gas may comprise essentially no liquid vehicle upon entry to the chamber.

In some embodiments, the suspension flow rate is in the range of 10 to 25 g/minute, including all values and subranges therebetween, including 18 g/min. In some embodiments, the atomizing gas flow rate nitrogen flow rate is in the range of 2 to 10 $Nm^3/hr$, including all values and subranges therebetween, including 5-6 $Nm^3/hr$.

Suspension flow and corresponding agglomerate size may be controlled by a pressure control system or a flow control system, as appropriate to the apparatus. For a pressure control system, a pressure controller is in communication with a delivery conduit such as tubing or piping and a suspension of primary particles in a liquid is introduced into the delivery conduit, which is then flowed to the nozzle. For a flow control system, an injector pump is provided, which delivers the suspension of primary particles in a liquid to the nozzle. Atomizing gas is typically separately supplied to the nozzle. In a preferred embodiment, a pump directs the liquid-particulate-binder-adhesion promoter mixture to the atomizing nozzle at a substantially constant flow rate. A constant flow rate can be advantageous as opposed to maintaining a constant pressure because the constant flow rate can help reduce variability in the particle sizes which, in turn, improves material utilization.

In one or more embodiments, the suspension comprises an inorganic material, an aqueous vehicle, and in some embodiments, an alkali-free binder and an adhesion promoter, which is supplied to the nozzle as a liquid-particulate-binder-adhesion promoter stream. That is, particles of an inorganic material can be mixed with an aqueous vehicle and a binder, for example, an alkali-free binder and an adhesion promoter to form a liquid-particulate-binder-adhesion promoter stream. The liquid-particulate-binder-adhesion promoter stream is atomized with the atomizing gas into liquid-particulate-binder-adhesion promoter droplets by the nozzle. In one or more embodiments, the liquid-particulate-binder-adhesion promoter stream is mixed with the atomizing gas. In one or more embodiments, the liquid-particulate-binder-adhesion promoter stream is directed into the atomizing nozzle thereby atomizing the particles into liquid-particulate-binder-adhesion promoter droplets. The liquid-particulate-binder-adhesion promoter droplets are comprised of the aqueous vehicle, the binder and the adhesion promoter, and the particles.

In one or more embodiments, the liquid-particulate-binder-adhesion promoter stream mixes with the atomizing gas via the atomizing nozzle. In one or more embodiments, the liquid-particulate-binder-adhesion promoter stream enters the atomizing nozzle. In one or more embodiments, the mixing of the liquid-particulate-binder-adhesion promoter stream with the atomizing gas occurs inside the atomizing nozzle. In one or more embodiments, the mixing of the liquid-particulate-binder-adhesion promoter stream with the atomizing gas occurs outside the atomizing nozzle.

Intermixing droplets and gaseous carrier stream 415. The droplets are conveyed toward the honeycomb body by a gaseous carrier stream. In one or more embodiments, the gaseous carrier stream comprises a carrier gas and the atomizing gas. In one or more embodiments, at least a portion of the carrier gas contacts the atomizing nozzle.

In one or more embodiments, substantially all of the aqueous vehicle is evaporated from the droplets to form agglomerates comprised of the particles and the binder and the adhesion promoter.

In one or more embodiments, the gaseous carrier stream is heated prior to being mixed with the droplets. In one or more embodiments, the gaseous carrier stream is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween. Without being bound to theory, it is believed that an advantage of a higher temperature is that the droplets evaporate faster and when the liquid is largely evaporated, they are less likely to stick when they collide. In certain embodiments, smaller agglomerates contribute to better filtration material deposits formation. Furthermore, it is believed that if droplets collide but contain only a small amount of liquid (such as only internally), the droplets may not coalesce to a spherical shape. In some embodiments, non-spherical agglomerates may provide desirable filtration performance.

In one or more embodiments, the atomizing gas is heated to form a heated atomizing gas, which is then flowed through and/or contacted with the nozzle. In one or more embodiments, the heated atomizing gas is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween.

In one or more embodiments, both the carrier gas and the atomizing gas are independently heated and contacted with the nozzle. In one or more embodiments, the gaseous steam is heated, but the atomizing gas and the nozzle are maintained at a low temperature (approximately equal to room temperature, e.g., 25-40° C.). In one or more embodiments, the atomizing nozzle is cooled during the atomizing. In one or more embodiments, a temperature of the atomizing nozzle is maintained below a boiling point of the aqueous vehicle.

The carrier gas is supplied to the apparatus to facilitate drying and carrying the liquid-particulate-binder-adhesion promoter droplets and resulting agglomerates through the apparatus and into the honeycomb body. In one or more embodiments, the carrier gas is predominantly an inert gas, such as nitrogen. In one or more embodiments, the carrier gas consists essentially of an inert gas. In one or more embodiments, the carrier gas is predominantly one or more inert gases. In one or more embodiments, the carrier gas is predominantly nitrogen gas. In one or more embodiments, the carrier gas is predominantly air. In one or more embodiments, the carrier gas consists essentially of nitrogen or air. In one or more embodiments, the carrier gas is dry. In one or more embodiments, the carrier gas comprises essentially no liquid vehicle upon entry to the chamber. In one or more embodiments, the carrier gas comprises less than 5 weight percent water vapor. In one or more embodiments, the carrier gas is heated prior to being mixed with the droplets. In one or more embodiments, the carrier gas is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween.

In one or more embodiments, the atomizing gas and the carrier gas are independently delivered to the apparatus at a pressure of greater than or equal to 90 psi, including greater than or equal to 95 psi, greater than or equal to 100 psi, greater than or equal to 105 psi, greater than or equal to 100 psi, greater than or equal to 115 psi, or greater than or equal to 120 psi. In one or more embodiments, a booster provides the atomizing gas and the carrier gas at a desired pressure. The apparatus can comprise a diffusing area downstream of the nozzle. At least some of the intermixing of the gaseous carrier stream with the liquid-particulate-binder-adhesion promoter droplets occurs in the diffusing area.

Upon intermixing of the gaseous carrier stream with the liquid-particulate-binder-adhesion promoter droplets inside the chamber, a gas-liquid-particulate-binder-adhesion promoter mixture is formed. The gas-liquid-particulate-binder-adhesion promoter mixture is heated at the intermixing zone. In one or more embodiments, droplets of liquid containing particles and binder and adhesion promoter are present during the intermixing. In one or more embodiments, the gaseous carrier stream is heated prior to intermixing with the liquid-particulate-binder-adhesion promoter droplets.

In an embodiment, the carrier gas is delivered to the chamber in an annular co-flow surrounding the nozzle. In an embodiment, the carrier gas is delivered to a chamber of the duct in an annular flow surrounding the nozzle in a co-flow around the droplets at the end of the nozzle.

Evaporation to Form Agglomerates 420.

To avoid liquid capillary force impact which may form non-uniform material which may result in high pressure drop penalty, the droplets are dried in an evaporation section of the apparatus, forming dry solid agglomerates, which may be referred to as secondary particles, or "microparticles" which are made up of primary nanoparticles, adhesion promoter, and binder-type material. The aqueous vehicle, or solvent, is evaporated and passes through the honeycomb body in a gaseous or vapor phase so that liquid solvent residual or condensation is minimized during material deposition. When the agglomerate is carried into the honeycomb body by gas flow, the residual liquid in the inorganic material should be less than 10 wt %. In some embodiments, all liquid is evaporated as a result of the drying and are converted into a gas or vapor phase. The liquid residual in some embodiments includes solvent in the mixture such water condensed from the gas phase. Binder is not considered as liquid residual, even if some or all of the binder may be in liquid or otherwise non-solid state before cure. In one or more embodiments, a total volumetric flow through the chamber is greater than or equal to 5 Nm³/hour and/or less than or equal to 200 Nm³/hour; including greater than or equal to 20 Nm³/hour and/or less than or equal to 100 Nm³/hour; and all values and subranges therebetween. Higher flow rates can deposit more material than lower flow rates. Higher flow rates can be useful as larger cross-sectional area filters are to be produced. Larger cross-sectional area filters may have applications in filter systems for building or outdoor filtration systems.

In one or more embodiments, substantially all of the aqueous vehicle is evaporated from the droplets to form agglomerates of the particles and the binder and the adhesion promoter, the agglomerates being interspersed in the gaseous carrier stream. In one or more embodiments, the apparatus has an evaporation section having an axial length which is sufficient to allow evaporation of at least a portion of the aqueous vehicle, including a substantial portion and/or all of the aqueous vehicle from the agglomerates.

Regarding flow, in an embodiment, a path of the droplets and a path of the gaseous carrier stream are substantially perpendicular prior to entering the evaporation section. In one or more embodiments, the carrier gas contacts the atomizing nozzle by way of a first path, and wherein a path of the droplets and a second path of the carrier gas are substantially perpendicular to each other prior to entering the evaporation section of the duct.

In another embodiment, a path of the droplets and a path of the gaseous carrier stream are substantially parallel upon entering the evaporation section. In one or more embodiments, a path of the droplets and a path of the gaseous carrier stream are substantially parallel to each other upon entering the evaporation section of the duct. In one or more embodiments, a path of the droplets and a path of the carrier gas are substantially parallel to each other upon entering an evaporation section of the duct.

In an embodiment, the gaseous carrier stream exits the chamber in a direction substantially parallel to gravity. In an embodiment, the gaseous carrier stream exits the chamber in a substantially downward direction. In an embodiment, the gaseous carrier stream exits the chamber in a substantially upward direction.

Deposition in Honeycomb Body 425.

The secondary particles or agglomerates of the primary particles are carried in gas flow, and the secondary particles or agglomerates, and/or aggregates thereof, are deposited on inlet wall surfaces of the honeycomb body when the gas passes through the honeycomb body. In one or more embodiments, the agglomerates and/or aggregates thereof are deposited onto the porous walls of the plugged honeycomb body. The deposited agglomerates may be disposed on, or in, or both on and in, the porous walls. In one or more embodiments, the plugged honeycomb body comprises inlet channels which are plugged at a distal end of the honeycomb body, and outlet channels which are plugged at a proximal end of the honeycomb body. In one or more embodiments, the agglomerates and/or aggregates thereof are deposited on, or in, or both on and in, the walls defining the inlet channels. The flow can be driven by a fan, a blower or a vacuum pump. Additional air can be drawn into the system to achieve a desired flow rate. A desired flow rate is in the range of 5 to 200 m³/hr. One exemplary honeycomb body is suitable for use as a gasoline particular filter (GPF), and has the following non-limiting characteristics: diameter of 4.055 inches (10.3 cm), length of 5.47 inches (13.9 cm), cells per square inch (CPSI) of 200, wall thickness of 8 mils (203 microns), and average pore size of 14 μm.

In one or more embodiments, the average diameter of the secondary particles or agglomerates is in a range of from 300 nm micron to 10 microns, 300 nm to 8 microns, 300 nm micron to 7 microns, 300 nm micron to 6 microns, 300 nm micron to 5 microns, 300 nm micron to 4 microns, or 300 nm micron to 3 microns. In specific embodiments, the average diameter of the secondary particles or agglomerates is in the range of 1.5 microns to 3 microns, including about 2 microns. The average diameter of the secondary particles or agglomerates can be measured by a scanning electron microscope.

In one or more embodiments, the average diameter of the secondary particles or agglomerates is in a range of from 300 nm to 10 microns, 300 nm to 8 microns, 300 nm to 7 microns, 300 nm to 6 microns, 300 nm to 5 microns, 300 nm to 4 microns, or 300 nm to 3 microns, including the range of 1.5 microns to 3 microns, and including about 2 microns, and there is a ratio in the average diameter of the secondary particles or agglomerates to the average diameter of the primary particles of in range of from about 2:1 to about 67:1; about 2:1 to about 9:1; about 2:1 to about 8:1; about 2:1 to about 7:1; about 2:1 to about 6:1; about 2:1 to about 5:1; about 3:1 to about 10:1; about 3:1 to about 9:1; about 3:1 to about 8:1; about 3:1 to about 7:1; about 3:1 to about 6:1; about 3:1 to about 5:1; about 4:1 to about 10:1; about 4:1 to about 9:1; about 4:1 to about 8:1; about 4:1 to about 7:1; about 4:1 to about 6:1; about 4:1 to about 5:1; about 5:1 to about 10:1; about 5:1 to about 9:1; about 5:1 to about 8:1; about 5:1 to about 7:1; or about 5:1 to about 6:1, and including about 10:1 to about 20:1.

In one or more embodiments, the depositing of the agglomerates onto the porous walls further comprises passing the gaseous carrier stream through the porous walls of the honeycomb body, wherein the walls of the honeycomb body filter out at least some of the agglomerates by trapping the filtered agglomerates on or in the walls of the honeycomb body. In one or more embodiments, the depositing of the agglomerates onto the porous walls comprises filtering the agglomerates from the gaseous carrier stream with the porous walls of the plugged honeycomb body.

Post-Treatment 430. A post-treatment may optionally be used to adhere the agglomerates to the honeycomb body, and/or to each other. That is, in one or more embodiments, at least some of the agglomerates adhere to the porous walls. In one or more embodiments, the post-treatment comprises heating and/or curing the binder, for example, an alkali-free binder and the adhesion promoter when present according to one or more embodiments. In one or more embodiments, the binder and the adhesion promoter causes the agglomerates to adhere or stick to the walls of the honeycomb body. In one or more embodiments, the binder and the adhesion promoter tackifies the agglomerates.

Depending on the binder composition, the curing conditions are varied. According to some embodiments, a low temperature cure reaction is utilized, for example, at a temperature of ≤100° C. In some embodiments, the curing can be completed in the vehicle exhaust gas with a temperature ≤950° C. A calcination treatment is optional, which can be performed at a temperature ≤650° C. Exemplary curing conditions are: a temperature range of from 40° C. to 200° C. for 10 minutes to 48 hours.

In one or more embodiments, the agglomerates and/or aggregates thereof are heated after being deposited on the honeycomb body. In one or more embodiments, the heating of the agglomerates causes an organic component of the binder and the adhesion promoter to be removed from the deposited agglomerates. In one or more embodiments, the heating of the agglomerates causes an inorganic component of the binder and the adhesion promoter to physically bond the agglomerates to the walls of the honeycomb body. In one or more embodiments, the heating of the agglomerates causes an inorganic component of the binder and the adhesion promoter to form a porous inorganic structure on the porous walls of the honeycomb body. In one or more embodiments, the heating of the deposited agglomerates burns off or volatilizes an organic component of the binder and the adhesion promoter from the deposited agglomerates.

In an aspect, a method for applying a surface treatment to a plugged honeycomb body comprising porous walls comprises: mixing particles of an inorganic material with an aqueous vehicle and a binder and an adhesion promoter to form a liquid-particulate-binder-adhesion promoter stream; mixing the liquid-particulate-binder-adhesion promoter stream with an atomizing gas, directing the liquid-particulate-binder-adhesion promoter stream into an atomizing nozzle thereby atomizing the particles into liquid-particulate-binder-adhesion promoter droplets comprised of the aqueous vehicle, the binder material, the adhesion promoter and the particles; conveying the droplets toward the plugged honeycomb body by a gaseous carrier stream, wherein the gaseous carrier stream comprises a carrier gas and the atomizing gas; evaporating substantially all of the aqueous vehicle from the droplets to form agglomerates comprised of the particles and the alkali-free binder and the adhesion promoter; depositing the agglomerates onto the porous walls of the plugged honeycomb body; wherein the deposited agglomerates are disposed on, or in, or both on and in, the porous walls.

In another aspect, methods for forming a honeycomb body comprise: supplying a suspension to a nozzle that is in fluid communication with a duct comprising an evaporation section, the suspension comprising an inorganic material, binder, for example, an alkali-free binder and an adhesion promoter, and an aqueous vehicle; supplying a carrier gas to the duct; contacting the nozzle with the carrier gas; in the evaporation section, evaporating at least a portion of the aqueous vehicle thereby forming agglomerates of the inorganic material; depositing the agglomerates on walls of the honeycomb body; and binding the inorganic material to the honeycomb body to form a porous inorganic material. The porous inorganic material may comprise primary particles and agglomerates of these primary particles.

A further aspect is: a method for applying an inorganic material to a plugged honeycomb body comprising porous walls, the method comprising: supplying a suspension comprising particles of the inorganic material and an aqueous vehicle to a nozzle that is in fluid communication with a duct comprising an evaporation section; atomizing the suspension with an atomizing gas to form droplets; supplying a heated carrier gas; intermixing a gaseous carrier stream including the heated carrier gas with the droplets inside a chamber of the duct to form a gas-liquid-particulate-binder-adhesion promoter mixture; evaporating at least a portion of the aqueous vehicle from the droplets to form agglomerates of the particles, the agglomerates being interspersed in the gaseous carrier stream; passing the agglomerates and the gaseous carrier stream into the plugged honeycomb body in fluid communication with the duct such that the gaseous carrier stream passes through porous walls of the plugged honeycomb body, and the walls of the plugged honeycomb body trap the agglomerates, wherein the agglomerates and/or aggregates thereof are deposited on or in the walls of the honeycomb body.

Apparatus

Examples of apparatuses that may be used for processes to deposit inorganic material with binder on ceramic honeycomb bodies are shown in FIGS. 2-6. Generally, apparatuses suitable for methods herein include a duct that defines a chamber. The duct may have several sections defining differing spaces and chambers. In one or more embodiments, the droplets and the gaseous carrier stream are conveyed through a duct having an outlet end proximate a plugged honeycomb body. The duct may comprise a converging section for engaging a proximal end of the honeycomb body. A converging section is advantageous in that fluid convection flow is enhanced. The duct may be in sealed fluid communication with the plugged honeycomb body during the depositing step. In one or more embodiments, the duct is adiabatic, or essentially adiabatic. In some embodiments, the nozzle temperature is regulated to achieve favorable atomization.

In some embodiments, a round cross-section chamber can facilitate keeping agglomerates entrained in the gaseous carrier stream. In various embodiments, a round cross-sectional duct reduces and/or prevents recirculation regions or "dead-zones" that can be the result of, for example, corners being present.

In one or more embodiments, an average temperature of walls of the duct is less than a temperature of the gaseous carrier stream. In one or more embodiments, an average temperature of walls of the duct is greater than a temperature of the gaseous carrier stream.

In the following, Apparatuses A-D (FIGS. 2-3 and 5-6) schematically show co-flow where a path of the droplets and a path of the gaseous carrier stream are substantially parallel upon entering the evaporation section. Apparatus "T" (FIG. 4) shows the carrier gas contacting an atomizing nozzle by way of a first path, and wherein a path of the droplets and a second path of the carrier gas are substantially perpendicular to each other prior to entering the evaporation section of the duct.

Figure 2:
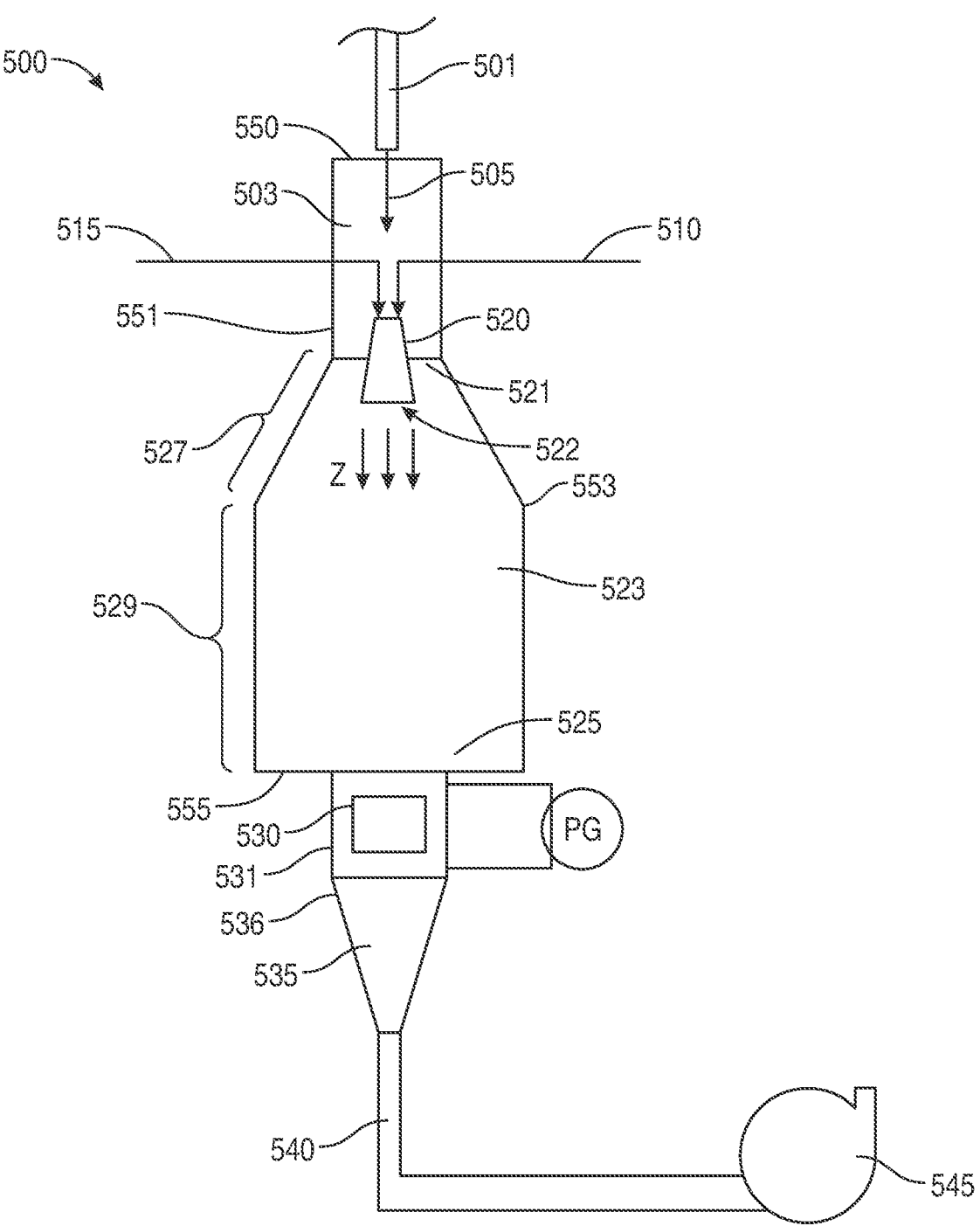
FIG. 2 schematically depicts an apparatus for depositing inorganic material according to embodiments disclosed herein.

FIG. 2 shows an apparatus 500, Apparatus "A", for forming honeycomb bodies, the apparatus 500 comprising a duct 551, a deposition zone 531, an exit zone 536, an exit conduit 540, and a flow driver 545.

The duct 551 spans from a first end 550 to a second end 555, defining a chamber of the duct comprising: a plenum space 503 at the first end 550 and an evaporation chamber 523 downstream of the plenum space 503. In one or more embodiments, the duct 551 is essentially adiabatic. That is, the duct 551 may have no external sources of heat. The evaporation chamber 523 is defined by an evaporation section 553 of the duct 551, which in this embodiment; comprises a first section of non-uniform diameter 527 and a second section of substantially uniform diameter 529. The evaporation section 553 comprises an inlet end 521 and an outlet end 525. The first section of non-uniform diameter 527 has a diameter that increases from the inlet end 521 toward the section of uniform diameter 529, which creates a diverging space for the flow to occupy.

A carrier gas is supplied to the duct 551 by a conduit 501, which may have a heat source to create a heated carrier gas 505. An atomizing gas 515 and a suspension 510 are separately supplied by individual delivery conduits such as tubing or piping to a nozzle 520, which is at the inlet end 521 of the evaporation section 553 and is in fluid communication with the duct 551, specifically in this embodiment with the evaporation chamber 523. The suspension 510 is atomized in the nozzle 520 with the atomizing gas 515. In one or more embodiments, the suspension 510 comprises an inorganic material, an aqueous vehicle, and a binder and adhesion promoter, as defined herein, which as supplied to the nozzle is a liquid-particulate-binder-adhesion promoter stream. The liquid-particulate-binder-adhesion promoter stream is atomized with the atomizing gas 515 into liquid-particulate-binder-adhesion promoter droplets by the nozzle 520.

In one or more embodiments, the heated carrier gas 505 flows over the nozzle 520. The atomizing gas 515 can be heated to form a heated atomizing gas. Temperature of the nozzle may be regulated as desired.

Outlet flow from the nozzle 520 and flow of the heated carrier gas 505 are both in a "Z" direction as shown in FIG. 2. There may be a diffusing area 522 downstream of the nozzle where at least some intermixing occurs. In this embodiment, the diffusing area 522 is located in the evaporation chamber 523, but in other embodiments, the diffusing area 522 may be located in the plenum space 503 depending on the location of the nozzle.

The outlet flow of from the nozzle intermixes with the heated carrier gas 505, thereby forming a gas-liquid-particulate-binder-adhesion promoter mixture, which flows through the chamber of the duct 551. Specifically, the gas-liquid-particulate-binder-adhesion promoter mixture flows through the evaporation chamber 523 of the evaporation section 553 and into the deposition zone 531 at the outlet end 525 of the evaporation section 553. At the intermixing, the gas-liquid-particulate-binder-adhesion promoter mixture is heated inside the chamber by the heated carrier gas.

In this embodiment, the outlet flow of the nozzle and the heated carrier gas enter the evaporation chamber 523 of the evaporation section 553 from substantially the same direction. In the evaporation chamber 523, substantially all of the aqueous vehicle from the droplets is evaporated thereby forming agglomerates of the particles and the binder and the adhesion promoter, the agglomerates being interspersed in a gaseous carrier stream, which is comprised of the carrier gas and the atomizing gas.

The deposition zone 531 in fluid communication with the duct 551 houses a plugged ceramic honeycomb body 530, for example, a wall-flow particulate filter. The deposition zone 531 has an inner diameter that is larger than the outer diameter of the ceramic honeycomb body 530. To avoid leakage of the gases carrying the ceramic powders, the ceramic honeycomb body 530 is sealed to the inner diameter of deposition zone 531, a suitable seal is, for example, an inflatable "inner tube". A pressure gauge, labelled as "PG," measures the difference in the pressure upstream and downstream from the particulate filter.

The gas-liquid-particulate-binder-adhesion promoter mixture flows into the ceramic honeycomb body 530 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates and/or aggregates thereof are deposited on or in the walls of the honeycomb body. The inorganic material binds to the ceramic honeycomb body upon post-treatment to the ceramic honeycomb body. In an embodiment, binder material and adhesion promoter causes the agglomerates to adhere or stick to the walls of the honeycomb body.

Downstream from the ceramic honeycomb body 530 is an exit zone 536 defining an exit chamber 535. The flow driver 545 is downstream from the ceramic honeycomb body 530, in fluid communication with the deposition zone 531 and the exit zone 536 by way of the exit conduit 540. Non-limiting examples of flow drivers are: a fan, a blower, and a vacuum pump. The aerosolized suspension is dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 500 is considered in a downward direction, for example, substantially parallel to the direction of gravity. In other embodiments, the apparatus is configured such that flow is directed in a substantially upward or vertical direction.

Figure 3:
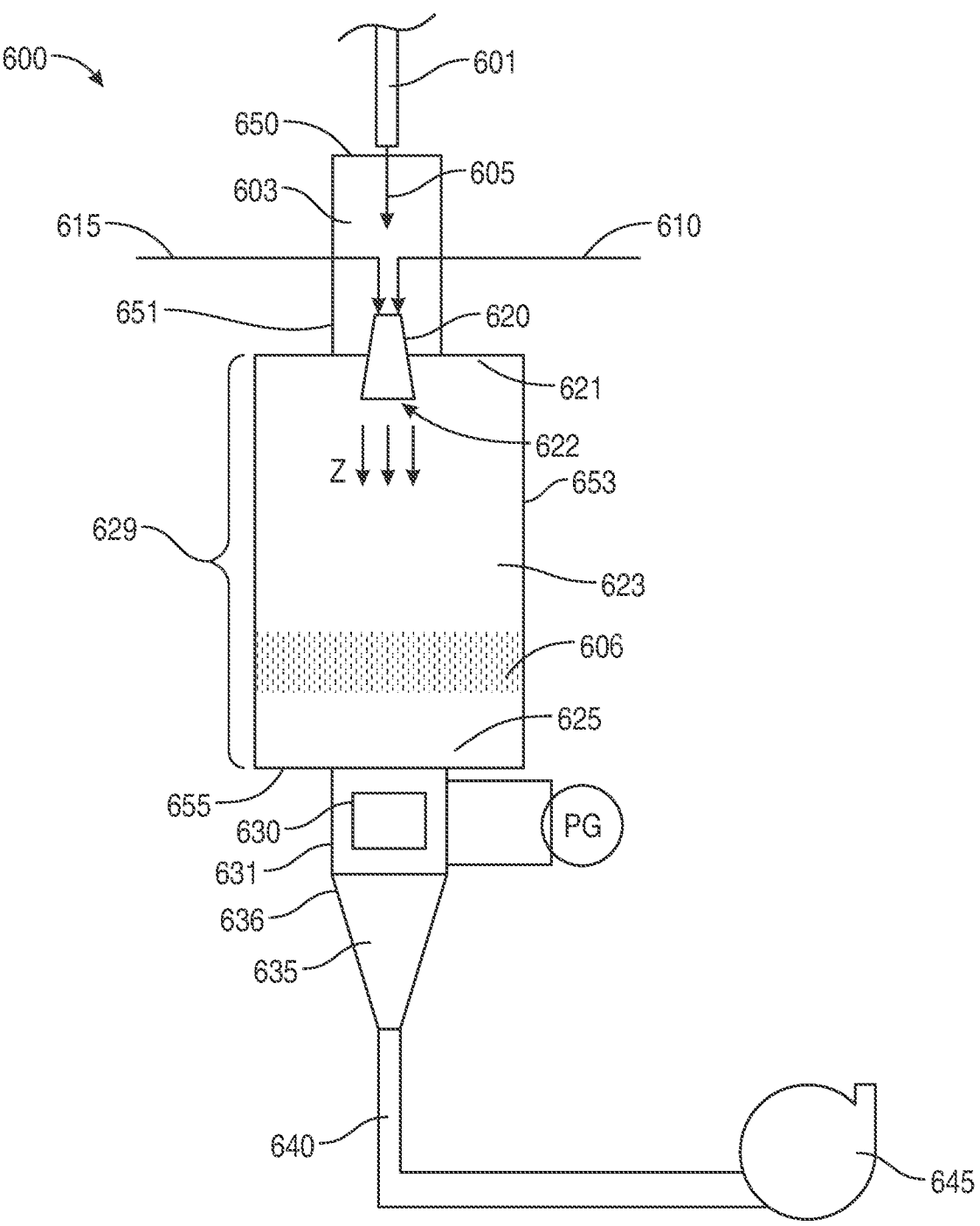
FIG. 3 schematically depicts an apparatus for depositing inorganic material according to embodiments disclosed herein.

In FIG. 3, an apparatus 600, Apparatus "B", for forming honeycomb bodies is shown comprising a duct 651, a deposition zone 631, an exit zone 636, an exit conduit 640, and a flow driver 645.

The duct 651 spans from a first end 650 to a second end 655, defining a chamber of the duct comprising: a plenum space 603 at the first end 650 and an evaporation chamber 623 downstream of the plenum space 603. In one or more embodiments, the diameter of the duct 651 defining the plenum space 603 can be equal to the diameter of the evaporation section 653 of the duct 651 defining the evaporation chamber 623. In one or more embodiments, the duct 651 is essentially adiabatic. That is, the duct 651 may have no external sources of heat. The evaporation chamber 623, in this embodiment, comprises a single section of substantially uniform diameter 629. The evaporation section 653 comprises an inlet end 621 and an outlet end 625.

A carrier gas is supplied to the duct 651 by a conduit 601, which may have a heat source to create a heated carrier gas 605. An atomizing gas 615 and a suspension 610 are separately supplied by individual delivery conduits such as tubing or piping to a nozzle 620, which is at the inlet end 621 of the evaporation section 653 and is in fluid communication with the duct 651, specifically in this embodiment with the evaporation chamber 623. The suspension 610 is atomized in the nozzle 620 with the atomizing gas 615. In one or more embodiments, the suspension 610 comprises an inorganic material, an aqueous vehicle, and a binder and adhesion promoter, as defined herein, which as supplied to the nozzle is a liquid-particulate-binder-adhesion promoter stream. The liquid-particulate-binder-adhesion promoter stream is atomized with the atomizing gas 615 into liquid-particulate-binder-adhesion promoter droplets by the nozzle 620. In one or more embodiments, the heated carrier gas 605 flows over the nozzle 620. The atomizing gas 615 can be heated to form a heated atomizing gas. The temperature of the nozzle may be regulated as desired.

Outlet flow from the nozzle 620 and flow of the heated carrier gas 605 are both in a "Z" direction as shown in FIG. 3. In specific embodiments, a diffusing area 622 is downstream of the nozzle where at least some intermixing occurs. In this embodiment, the diffusing area 622 is located in the evaporation chamber 623, but in other embodiments the diffusing area may be located in the plenum space 603 depending on the location of the nozzle.

The outlet flow from the nozzle intermixes with the heated carrier gas 605, thereby forming a gas-liquid-particulate-binder-adhesion promoter mixture, which flows through the chamber of the duct 651. Specifically, the gas-liquid-particulate-binder-adhesion promoter mixture flows through the evaporation chamber 623 of the evaporation section 653 and into the deposition zone 631 at the outlet end 625 of the evaporation section 653. At the intermixing, the gas-liquid-particulate-binder-adhesion promoter mixture is heated inside the chamber by the heated carrier gas.

In this embodiment, the outlet flow of the nozzle and the carrier gas enter the evaporation chamber 623 of the evaporation section 653 from substantially the same direction. In the evaporation chamber 623, substantially all of the aqueous vehicle from the droplets is evaporated thereby forming agglomerates of the particles and the binder and the adhesion promoter, the agglomerates being interspersed in a gaseous carrier stream, which is comprised of the carrier gas and the atomizing gas.

The deposition zone 631 in fluid communication with the duct 651 houses a plugged ceramic honeycomb body 630, for example, a wall-flow particulate filter. The deposition zone 631 has an inner diameter that is larger than the outer diameter of the ceramic honeycomb body 630. To avoid leakage of the gases carrying the ceramic powders, the ceramic honeycomb body 630 is sealed to the inner diameter of the deposition zone 631, a suitable seal is, for example, an inflatable "inner tube". A pressure gauge, labelled as "PG" measures the difference in the pressure upstream and downstream from the particulate filter.

The gas-liquid-particulate-binder-adhesion promoter mixture flows into the ceramic honeycomb body 630 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates are deposited on or in the walls of the honeycomb body. The inorganic material binds to the ceramic honeycomb body upon post-treatment to the ceramic honeycomb body. In an embodiment, binder material and adhesion promoter causes the agglomerates to adhere or stick to the walls of the honeycomb body.

Downstream from the ceramic honeycomb body 630 is an exit zone 636 defining an exit chamber 635. The flow driver 645 is downstream from the ceramic honeycomb body 630, in fluid communication with the deposition zone 631 and the exit zone 636 by way of the exit conduit 640. Non-limiting examples of flow drivers are: fan, blower, and vacuum pump. The aerosolized suspension is dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 600 is considered in a downward direction, for example, substantially parallel to the direction of gravity. In other embodiments, the apparatus is configured such that flow is directed in a substantially upward or vertical direction.

Figure 4:
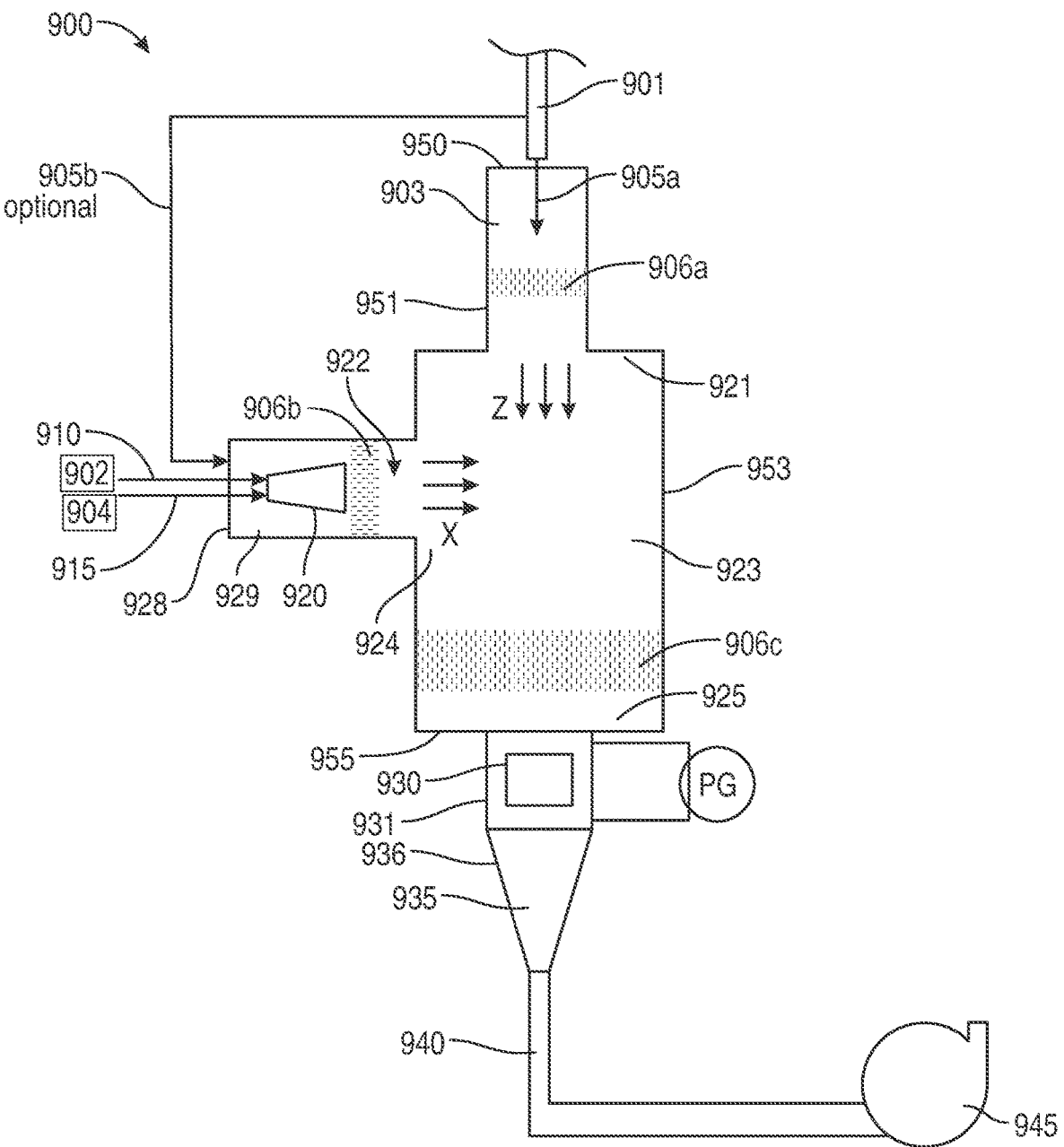
FIG. 4 schematically depicts an apparatus for depositing inorganic material according to embodiments disclosed herein.

In FIG. 4, an apparatus 900, Apparatus "T", for forming honeycomb bodies is shown comprising a duct 951, a deposition zone 931, an exit zone 936, an exit conduit 940, and a flow driver 945.

The duct 951 spans from a first end 950 to a second end 955 including a right cylindrical section 928, all defining a chamber of the duct comprising: a first plenum space 903 at the first end 950, an evaporation chamber 923 downstream of the plenum space 603, and a second plenum space 929 defined by the right cylindrical section 928. In one or more embodiments, the diameter of the duct 951 defining the plenum space 903 can be equal to the diameter of a first inlet location 921 of an evaporation section 953 of the duct 951. In one or more embodiments, the duct 951 is essentially adiabatic. That is, the duct 951 may have no external sources of heat. The evaporation chamber 923 is defined by the evaporation section 953 of the duct 951. The evaporation section 953 comprises the first inlet location 921 from the first plenum space 903, a second inlet location 924 from the second plenum space 929, and an outlet end 925. In some embodiments, some evaporation may occur in at least a portion of second plenum space 929 defined by the right cylindrical section 928.

A carrier gas is supplied in a first path to the duct 951 by a conduit 901, which may have a heat source 906a to create a primary heated carrier gas 905a that enters the first plenum space 903, and optionally another secondary heated carrier gas 905b that enters the second plenum space 929 by a second path. An atomizing gas 915 and a suspension 910 are separately supplied by individual delivery conduits such as tubing or piping to a nozzle 920, which is in the second plenum space 929 of the right cylindrical section 928 and is in fluid communication with the evaporation chamber 923 of the evaporation section 953. The suspension 910 is atomized in the nozzle 920 with the atomizing gas 915. In one or more embodiments, the suspension 910 comprises an inorganic material, an aqueous vehicle, and a binder and adhesion promoter, as defined herein, which as supplied to the nozzle is a liquid-particulate-binder-adhesion promoter stream. The liquid-particulate-binder-adhesion promoter stream is atomized with the atomizing gas 915 into liquid-particulate-binder-adhesion promoter droplets by the nozzle 920.

In one or more embodiments, the secondary heated carrier gas 905b flows over the nozzle 920 Temperature of the nozzle may be regulated as desired.

Outlet flow from the nozzle 920 and, when present, flow of the secondary heated carrier gas 905b are both is in an "X" direction as shown in FIG. 4. Flow of the primary heated carrier gas 905a is in a "Z" direction as shown in FIG. 4. There may be a diffusing area 922 downstream of the nozzle where at least some intermixing occurs. In this embodiment, the diffusing area 922 is located at least partially in the second plenum space 929, but in other embodiments, the diffusing area 922 may be located in evaporation chamber 923 depending on the location of the nozzle.

The outlet flow of from the nozzle intermixes with the heated carrier gases 905a and 905b, thereby forming a gas-liquid-particulate-binder-adhesion promoter mixture, which flows through the chamber of the duct 951. Specifically, the gas-liquid-particulate-binder-adhesion promoter mixture flows through the evaporation chamber 923 of the evaporation section 953 and into the deposition zone 931 at the outlet end 925 of the evaporation section 953. At the intermixing, the gas-liquid-particulate-binder-adhesion promoter mixture is heated inside the chamber by the heated carrier gas.

In this embodiment, the outlet flow of the nozzle and the primary carrier gas 905a enter the evaporation chamber 923 of the evaporation section 953 from substantially perpendicular directions. In the evaporation chamber 923, substantially all of the aqueous vehicle from the droplets is evaporated thereby forming agglomerates of the particles and the binder and the adhesion promoter, the agglomerates being interspersed in a gaseous carrier stream, which is comprised of the carrier gases and the atomizing gas.

The deposition zone 931 in fluid communication with the duct 951 houses a plugged ceramic honeycomb body 930, for example, a wall-flow particulate filter. The deposition zone 931 has an inner diameter that is larger than the outer diameter of the ceramic honeycomb body 930. To avoid leakage of the gases carrying the ceramic powders, the ceramic honeycomb body 930 is sealed to the inner diameter of the deposition zone 931, a suitable seal is, for example, an inflatable "inner tube". A pressure gauge, labelled as "PG," measures the difference in the pressure upstream and downstream from the particulate filter.

The gas-liquid-particulate-binder-adhesion promoter mixture flows into the ceramic honeycomb body 930 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates are deposited on or in the walls of the honeycomb body. The inorganic material binds to the ceramic honeycomb body upon post-treatment to the ceramic honeycomb body. In an embodiment, binder and adhesion promoter cause the agglomerates to adhere or stick to the walls of the honeycomb body.

Downstream from the ceramic honeycomb body 930 is an exit zone 936 defining an exit chamber 935. The flow driver 945 is downstream from the ceramic honeycomb body 930, in fluid communication with the deposition zone 931 and the exit zone 936 by way of the exit conduit 940. Non-limiting examples of flow drivers are: fan, blower, and vacuum pump. The aerosolized suspension is dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Overall flow through embodiments such as apparatus 900 is considered in a downward direction, for example, substantially parallel to the direction of gravity. In other embodiments, the apparatus is configured such that flow is directed in a substantially upward or vertical direction.

Figure 5:
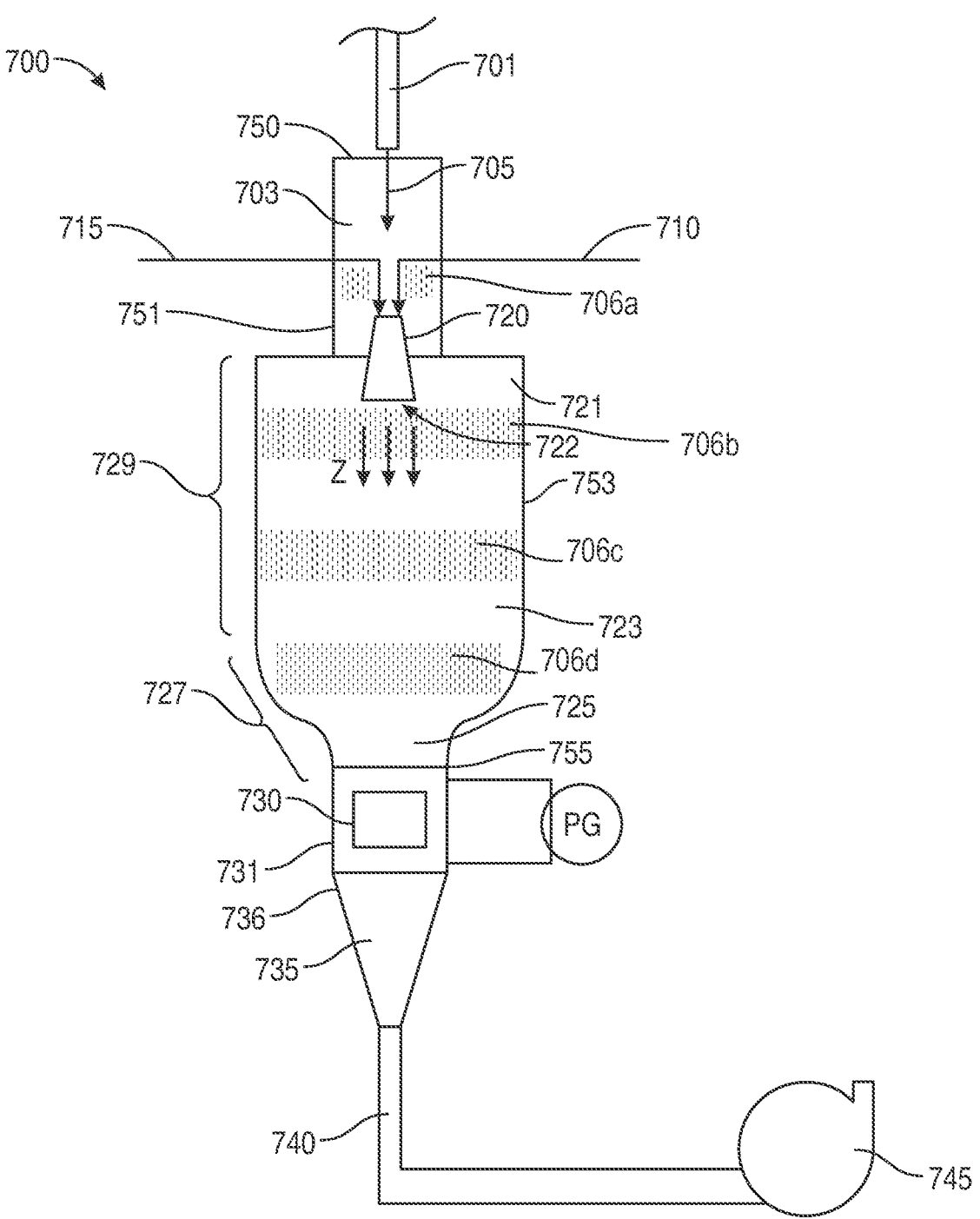
FIG. 5 schematically depicts an apparatus for depositing inorganic material according to embodiments disclosed herein.

FIG. 5 shows an apparatus 700, Apparatus "C", for forming honeycomb bodies, the apparatus 700 comprising a duct 751, a deposition zone 731, an exit zone 736, an exit conduit 740, and a flow driver 745.

The duct 751 spans from a first end 750 to a second end 755, defining a chamber of the duct comprising: a plenum space 703 at the first end 750 and an evaporation chamber 723 downstream of the plenum space 703. In one or more embodiments, the diameter of the duct 751 defining the plenum space 703 can be equal to the diameter of an evaporation section 753 at an inlet end 721. In one or more embodiments, the duct 751 is essentially adiabatic. That is, the duct 751 may have no external sources of heat. The evaporation chamber 723 is defined by the evaporation section 753 of the duct 751, which in this embodiment, comprises a first section of non-uniform diameter 727 and a second section of substantially uniform diameter 729. The evaporation section 753 comprises the inlet end 721 and an outlet end 725. The first section of non-uniform diameter 727 has a diameter that decreases from the outlet end 725 toward the section of uniform diameter 729, which creates a converging space for the flow as it enters the deposition zone 731.

A carrier gas is supplied to the duct 751 by a conduit 701, which may have a heat source to create a heated carrier gas 705. An atomizing gas 715 and a suspension 710 are separately supplied by individual delivery conduits such as tubing or piping to a nozzle 720, which is at the inlet end 721 of the evaporation section 753 and is in fluid communication with the duct 751, specifically in this embodiment with the evaporation chamber 723. The suspension 710 is atomized in the nozzle 720 with the atomizing gas 715. In one or more embodiments, the suspension 710 comprises an inorganic material, an aqueous vehicle, and a binder and adhesion promoter, as defined herein, which as supplied to the nozzle is a liquid-particulate-binder-adhesion promoter stream. The liquid-particulate-binder-adhesion promoter stream is atomized with the atomizing gas 715 into liquid-particulate-binder-adhesion promoter droplets by the nozzle 720.

In one or more embodiments, the heated carrier gas 705 flows over the nozzle 720. The atomizing gas 715 can be heated to form a heated atomizing gas. Temperature of the nozzle may be regulated as desired.

Outlet flow from the nozzle 720 and flow of the heated carrier gas 705 are both in a "Z" direction as shown in FIG. 5. There may be a diffusing area 722 downstream of the nozzle where at least some intermixing occurs. In this embodiment, the diffusing area 722 is located in the evaporation chamber 723, but in other embodiments, the diffusing area may be located in the plenum space 703 depending on the location of the nozzle.

The outlet flow of from the nozzle intermixes with the heated carrier gas 705, thereby forming a gas-liquid-particulate-binder-adhesion promoter mixture, which flows through the chamber of the duct 751. Specifically, the gas-liquid-particulate-binder-adhesion promoter mixture flows through the evaporation chamber 723 of the evaporation section 753 and into the deposition zone 731 at the outlet end 725 of the evaporation section 753. At the intermixing, the gas-liquid-particulate-binder-adhesion promoter mixture is heated inside the chamber by the heated carrier gas.

In this embodiment, the outlet flow of the nozzle and the heated carrier gas enter the evaporation chamber 723 of the evaporation section 753 from substantially the same direction. In the evaporation chamber 723, substantially all of the aqueous vehicle from the droplets is evaporated thereby forming agglomerates of the particles and the binder and the adhesion promoter, the agglomerates being interspersed in a gaseous carrier stream, which is comprised of the carrier gas and the atomizing gas.

The deposition zone 731 in fluid communication with the duct 751 houses a plugged ceramic honeycomb body 730, for example, a wall-flow particulate filter. The deposition zone 731 has an inner diameter that is larger than the outer diameter of the ceramic honeycomb body 730. To avoid leakage of the gases carrying the ceramic powders, the ceramic honeycomb body 730 is sealed to the inner diameter of the deposition zone 731, a suitable seal is, for example, an inflatable "inner tube". A pressure gauge, labelled as "PG" measures the difference in the pressure upstream and downstream from the particulate filter. The gas-liquid-particulate-binder-adhesion promoter mixture flows into the ceramic honeycomb body 730 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates and/or aggregates thereof are deposited on or in the walls of the honeycomb body. The inorganic material binds to the ceramic honeycomb body upon post-treatment to the ceramic honeycomb body. In an embodiment, binder and adhesion promoter cause the agglomerates to adhere or stick to the walls of the honeycomb body.

Downstream from the ceramic honeycomb body 730 is an exit zone 736 defining an exit chamber 735. The flow driver 745 is downstream from the ceramic honeycomb body 730, in fluid communication with the deposition zone 731 and the exit zone 736 by way of the exit conduit 740. Non-limiting examples of flow drivers are: fan, blower, and vacuum pump. The droplets of the atomized suspension are aerosolized and dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 700 is considered in a downward direction, for example, substantially parallel to the direction of gravity. In other embodiments, the apparatus is configured such that flow is directed in a substantially upward or vertical direction.

Figure 6:
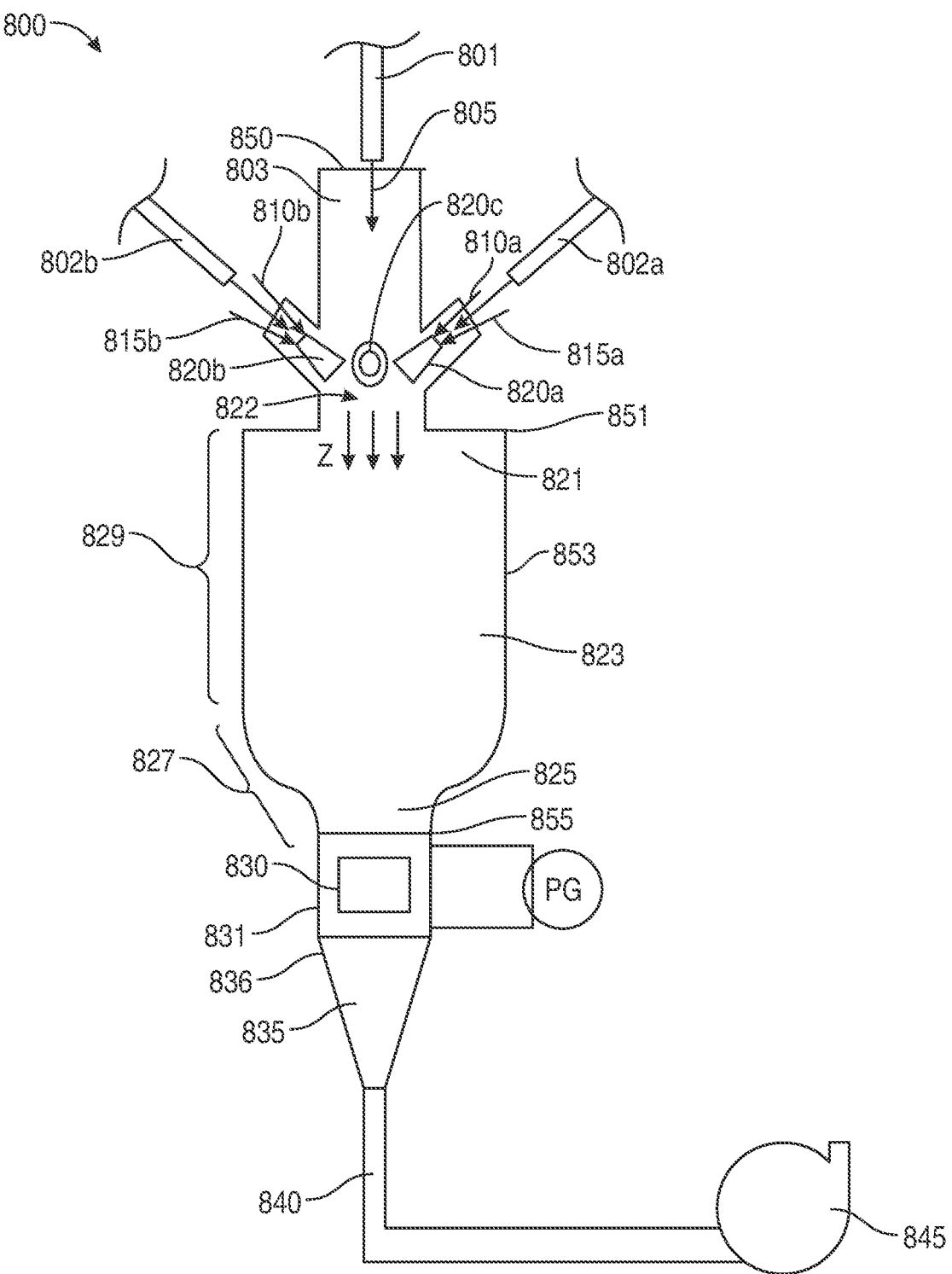
FIG. 6 schematically depicts an apparatus for depositing inorganic material according to embodiments disclosed herein.

FIG. 6 shows an apparatus 800, Apparatus "D", for forming honeycomb bodies, the apparatus 800 comprising a duct 851, a deposition zone 831, an exit zone 836, an exit conduit 840, and a flow driver 845.

The duct 851 spans from a first end 850 to a second end 855, defining a chamber of the duct comprising: a plenum space 803 at the first end 850 and an evaporation chamber 823 downstream of the plenum space 803. In one or more embodiments, the duct 851 is essentially adiabatic. That is, the duct 851 may have no external sources of heat. The evaporation chamber 823 is defined by an evaporation section 853 of the duct 851, which in this embodiment, comprises a first section of non-uniform diameter 827 and a second section of substantially uniform diameter 829. The evaporation section 853 comprises an inlet end 821 and an outlet end 825. The first section of non-uniform diameter 827 has a diameter that decreases from the outlet end 825 toward the section of uniform diameter 829, which creates a converging space for the flow as it enters the deposition zone 831. In some embodiments, the evaporation section 853 is configured to have a single section of substantially uniform diameter analogous to Apparatus "B". Alternatively, the evaporation section 853 has a section of non-uniform diameter that increases from the inlet end 821 toward a section of uniform diameter analogous to Apparatus "A."

A carrier gas is supplied to the duct 851 by a conduit 801, which may have a heat source to create a heated carrier gas 805. An atomizing gas 815 and a suspension 810 are separately supplied by individual delivery conduits such as tubing or piping to a plurality of nozzles 820a, 820b, and 820c, which are in fluid communication with the plenum space 803. Each nozzle has an inflow of the atomizing gas e.g., 815a supplies the nozzle 820a and 815b supplies the nozzle 820b. Each nozzle has an inflow of the suspension e.g., 810a supplies the nozzle 820a and 810b supplies the nozzle 820b. Optionally, each nozzle has a supply of the heated carrier gas, e.g., 802a supplies the nozzle 820a and 802b supplies the nozzle 820b. While the embodiment of FIG. 6 shows three nozzles, in other embodiments, a plurality of nozzles of any number is be used. The suspension 810 is atomized in the nozzle 820 with the atomizing gas 815. In one or more embodiments, the suspension 810 comprises an inorganic material, an aqueous vehicle, and a binder and adhesion promoter, as defined herein, which as supplied to the nozzle is a liquid-particulate-binder-adhesion promoter stream. The liquid-particulate-binder-adhesion promoter stream is atomized with the atomizing gas 815 into liquid-particulate-binder-adhesion promoter droplets by the nozzle 820.

In one or more embodiments, the heated carrier gas 805 and optionally 802a and 802b flow over the nozzles. The atomizing gas 815a and 815b can be heated to form a heated atomizing gas. Temperatures of the nozzles may be regulated, individually or collectively, as desired.

Flow of the heated carrier gas 805 is in a "Z" direction as shown in FIG. 6. While outlet flow from the nozzles 820a,

820b, and 820c may be angled towards a center of the duct 851, upon intermixing with the heated carrier gas 805, the outlet flow of the nozzles will generally be in the "Z" direction. There may be a diffusing area 822 downstream of the nozzles where at least some intermixing occurs. In this embodiment, the diffusing area 822 is located in the plenum space 803, but in other embodiments, the diffusing area may be located in the evaporation chamber 823 depending on the location of the nozzles.

The outlet flow of from the nozzles intermixes with the heated carrier gas 805, thereby forming a gas-liquid-particulate-binder-adhesion promoter mixture, which flows through the chamber of the duct 851. Specifically, the gas-liquid-particulate-binder-adhesion promoter mixture flows through the evaporation chamber 823 of the evaporation section 853 and into the deposition zone 831 at the outlet end 825 of the evaporation section 853. At the intermixing, the gas-liquid-particulate-binder-adhesion promoter mixture is heated inside the chamber by the heated carrier gas.

In this embodiment, the outlet flow of the nozzles and the heated gas enter the evaporation chamber 823 of the evaporation section 853 from substantially the same direction. In the evaporation chamber 823, substantially all of the aqueous vehicle from the droplets is evaporated thereby forming agglomerates of the particles and the binder and the adhesion promoter, the agglomerates being interspersed in a gaseous carrier stream, which is comprised of the carrier gas and the atomizing gas.

The deposition zone 831 in fluid communication with the duct 851 houses a plugged ceramic honeycomb body 830, for example, a wall-flow particulate filter or "wall-flow filter." The deposition zone 831 has an inner diameter that is larger than the outer diameter of the ceramic honeycomb body 830. To avoid leakage of the gases carrying the ceramic powders, the ceramic honeycomb body 830 is sealed to the inner diameter of deposition zone 831, a suitable seal is, for example, an inflatable "inner tube". A pressure gauge, labelled as "PG," measures the difference in the pressure upstream and downstream from the particulate filter. The gas-liquid-particulate-binder-adhesion promoter mixture flows into the ceramic honeycomb body 830 thereby depositing the inorganic material of the suspension on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates and/or aggregates thereof are deposited on or in the walls of the honeycomb body. The inorganic material binds to the ceramic honeycomb body upon post-treatment to the ceramic honeycomb body. In an embodiment, binder and adhesion promoter cause the agglomerates to adhere or stick to the walls of the honeycomb body.

Downstream from the ceramic honeycomb body 830 is an exit zone 836 defining an exit chamber 835. The flow driver 845 is downstream from the ceramic honeycomb body 830, in fluid communication with the deposition zone 831 and the exit zone 836 by way of the exit conduit 840. Non-limiting examples of flow drivers are: fan, blower, and vacuum pump. The droplets of the atomized suspension are aerosolized and dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 800 is considered in a downward direction, for example, substantially parallel to the direction of gravity. In other embodiments, the apparatus may be configured such that flow is directed in a substantially upward or vertical direction.

General Overview of Honeycomb Bodies

The ceramic articles herein comprise honeycomb bodies comprised of a porous ceramic honeycomb structure of porous walls having wall surfaces defining a plurality of inner channels.

In some embodiments, the porous ceramic walls comprise a material such as a filtration material which may comprise in some portions or some embodiments a porous inorganic layer disposed on one or more surfaces of the walls. In some embodiments, the filtration material comprises one or more inorganic materials, such as one or more ceramic or refractory materials. In some embodiments, the filtration material is disposed on the walls to provide enhanced filtration efficiency, both locally through and at the wall and globally through the honeycomb body, at least in the initial use of the honeycomb body as a filter following a clean state, or regenerated state, of the honeycomb body, for example such as before a substantial accumulation of ash and/or soot occurs inside the honeycomb body after extended use of the honeycomb body as a filter.

In one aspect, the filtration material is present in some portions or some embodiments as a layer disposed on the surface of one or more of the walls of the honeycomb structure. The layer in some embodiments is porous to allow the gas flow through the wall. In some embodiments, the layer is present as a continuous coating over at least part of the, or over the entire, surface of the one or more walls. In some embodiments of this aspect, the filtration material is flame-deposited filtration material.

In another aspect, the filtration material is present as a plurality of discrete regions of filtration material disposed on the surface of one or more of the walls of the honeycomb structure. The filtration material may partially block a portion of some of the pores of the porous walls, while still allowing gas flow through the wall. In some embodiments of this aspect, the filtration material is aerosol-deposited filtration material. In some preferred embodiments, the filtration material comprises a plurality of inorganic particle agglomerates, wherein the agglomerates are comprised of inorganic or ceramic or refractory material. In some embodiments, the agglomerates are porous, thereby allowing gas to flow through the agglomerates.

In some embodiments, a honeycomb body comprises a porous ceramic honeycomb body comprising a first end, a second end, and a plurality of walls having wall surfaces defining a plurality of inner channels. A deposited material such as a filtration material, which may be in some portions or some embodiments a porous inorganic layer, is disposed on one or more of the wall surfaces of the honeycomb body. The deposited material such as a filtration material, which may be a porous inorganic layer has a porosity as measured by mercury intrusion porosimetry, SEM, or X-ray tomography in a range of from about 20% to about 95%, or from about 25% to about 95%, or from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, or from about 20% to about 90%, or from about 25% to about 90%, or from about 30% to about 90%, or from about 40% to about 90%, or from about 45% to about 90%, or from about 50% to about 90%, or from about 55% to about 90%, or from about 60% to about 90%, or from about 65% to about 90%, or from about 70% to about 90%, or from about 75% to about 90%, or from about 80% to about 90%, or from about 85% to about 90%, or from about 20% to about 85%, or from about 25% to about 85%, or from about 30% to about 85%, or from about 40% to about 85%, or from about 45% to about 85%, or from about 50% to about 85%, or from about 55% to about 85%, or from about 60% to about 85%, or from about 65% to about 85%, or from about 70% to about 85%, or from about 75% to about 85%, or from about 80% to about 85%, or from about 20% to about 80%, or from about 25% to about 80%, or from about 30% to about 80%, or from about 40% to about 80%, or from about 45% to about 80%, or from about 50% to about 80%, or from about 55% to about 80%, or from about 60% to about 80%, or from about 65% to about 80%, or from about 70% to about 80%, or from about 75% to about 80%, and the deposited material such as a filtration material, which may be a porous inorganic layer that has an average thickness of greater than or equal to 0.5 μm and less than or equal to 50 μm, or greater than or equal to 0.5 μm and less than or equal to 45 μm, greater than or equal to 0.5 μm and less than or equal to 40 μm, or greater than or equal to 0.5 μm and less than or equal to 35 μm, or greater than or equal to 0.5 μm and less than or equal to 30 μm, greater than or equal to 0.5 μm and less than or equal to 25 μm, or greater than or equal to 0.5 μm and less than or equal to 20 μm, or greater than or equal to 0.5 μm and less than or equal to 15 μm, greater than or equal to 0.5 μm and less than or equal to 10 μm. Various embodiments of honeycomb bodies and methods for forming such honeycomb bodies will be described herein with specific reference to the appended drawings.

The material in some embodiments comprises a filtration material, and in some embodiments comprises an inorganic filtration material. According to one or more embodiments, the inorganic filtration material provided herein comprises discrete regions and/or a discontinuous layer formed from the inlet end to the outlet end comprising discrete and disconnected patches of material or filtration material and binder and adhesion promoter comprised of primary particles in secondary particles or agglomerates that are substantially spherical. In one or more embodiments, the primary particles are non-spherical. In one or more embodiments, "substantially spherical" refers to agglomerate having circularity in cross section in a range of from about 0.8 to about 1 or from about 0.9 to about 1, with 1 representing a perfect circle. In one or more embodiments, 75% of the primary particles deposited on the honeycomb body have a circularity of less than 0.8. In one or more embodiments, the secondary particles or agglomerates deposited on the honeycomb body have an average circularity greater than 0.9, greater than 0.95, greater than 0.96, greater than 0.97, greater than 0.98, or greater than 0.99.

Circularity can be measured using a scanning electron microscope (SEM). The term "circularity of the cross-section (or simply circularity)" is a value expressed using the equation shown below. A circle having a circularity of 1 is a perfect circle.

$$\text{Circularity} = (4\pi \times \text{cross-sectional area})/(\text{length of circumference of the cross-section})^2.$$

A honeycomb body of one or more embodiments may comprise a honeycomb structure and deposited material such as a filtration material disposed on one or more walls of the honeycomb structure. In some embodiments, the deposited material such as a filtration material is applied to surfaces of walls present within honeycomb structure, where the walls have surfaces that define a plurality of inner channels.

The inner channels, when present, may have various cross-sectional shapes, such as circles, ovals, triangles, squares, pentagons, hexagons, or tessellated combinations or any of these, for example, and may be arranged in any suitable geometric configuration. The inner channels, when present, may be discrete or intersecting and may extend through the honeycomb body from a first end thereof to a second end thereof, which is opposite the first end.

Figures 7, 8:
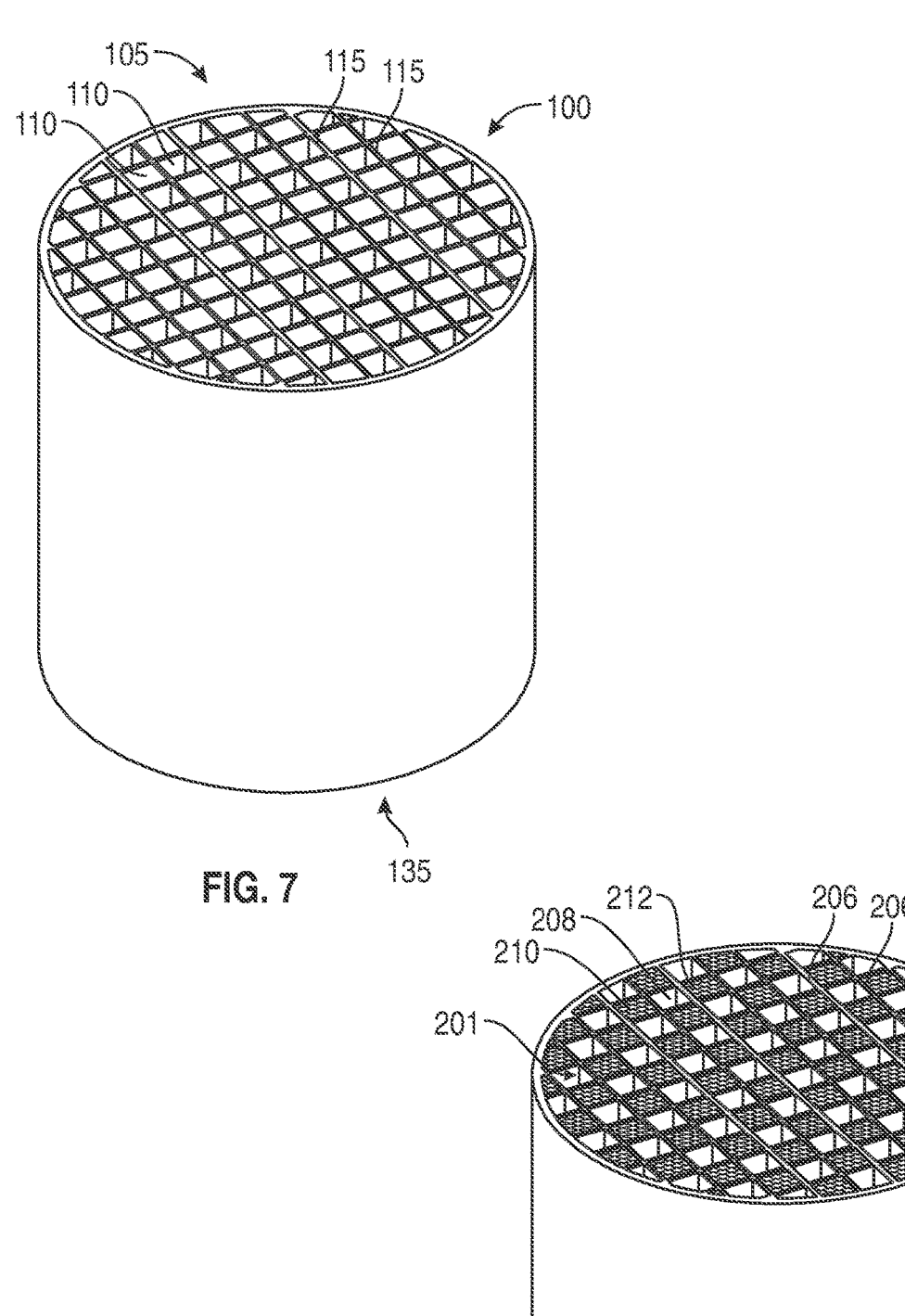
FIG. 7 schematically depicts an unplugged honeycomb body.
FIG. 8 schematically depicts a wall-flow particulate filter according to embodiments disclosed and described herein.

With reference now to FIG. 7, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105, which may be an inlet end, and second end 135, which may be an outlet end, of the honeycomb body. The honeycomb body may have one or more of the channels plugged on one, or both of the first end 105 and the second end 135. The pattern of plugged channels of the honeycomb body is not limited. In some embodiments, a pattern of plugged and unplugged channels at one end of the honeycomb body may be, for example, a checkerboard pattern where alternating channels of one end of the honeycomb body are plugged. In some embodiments, plugged channels at one end of the honeycomb body have corresponding unplugged channels at the other end, and unplugged channels at one end of the honeycomb body have corresponding plugged channels at the other end.

In one or more embodiments, the honeycomb body may be formed from cordierite, aluminum titanate, enstatite, mullite, forsterite, corundum (SiC), spinel, sapphirine, and periclase. In general, cordierite has a composition according to the formula $Mg_2Al_4Si_5O_{18}$. In some embodiments, the pore size of the ceramic material, the porosity of the ceramic material, and the pore size distribution of the ceramic material are controlled, for example by varying the particle sizes of the ceramic raw materials. In addition, pore formers can be included in ceramic batches used to form the honeycomb body.

In some embodiments, walls of the honeycomb body may have an average thickness from greater than or equal to 25 μm to less than or equal to 250 μm, such as from greater than or equal to 45 μm to less than or equal to 230 μm, greater than or equal to 65 μm to less than or equal to 210 μm, greater than or equal to 65 μm to less than or equal to 190 μm, or greater than or equal to 85 μm to less than or equal to 170 μm. The walls of the honeycomb body can be described to have a base portion comprised of a bulk portion (also referred to herein as the bulk), and surface portions (also referred to herein as the surface). The surface portion of the walls extends from a surface of a wall of the honeycomb body into the wall toward the bulk portion of the honeycomb body. The surface portion may extend from 0 (zero) to a depth of about 10 μm into the base portion of the wall of the honeycomb body. In some embodiments, the surface portion may extend about 5 μm, about 7 μm, or about 9 μm (i.e., a depth of 0 (zero)) into the base portion of the wall. The bulk portion of the honeycomb body constitutes the thickness of wall minus the surface portions. Thus, the bulk portion of the honeycomb body may be determined by the following equation:

$$t_{total} - 2t_{surface}$$

where $t_{total}$ is the total thickness of the wall and $t_{surface}$ is the thickness of the wall surface.

In one or more embodiments, the bulk of the honeycomb body (prior to applying any filtration material) has a bulk median pore size from greater than or equal to 7 μm to less than or equal to 25 μm, such as from greater than or equal to 12 μm to less than or equal to 22 μm, or from greater than or equal to 12 μm to less than or equal to 18 μm. For example, in some embodiments, the bulk of the honeycomb body may have bulk median pore sizes of about 10 μm, about 11 μm, about 12 μm, about 13 μm, about 14 μm, about 15 μm, about 16 μm, about 17 μm, about 18 μm, about 19 μm, or about 20 μm. Generally, pore sizes of any given material exist in a statistical distribution. Thus, the term "median pore size" or "d50" (prior to applying any filtration material) refers to a length measurement, above which the pore sizes of 50% of the pores lie and below which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In specific embodiments, the median pore size (d50) of the bulk of the honeycomb body (prior to applying any filtration material) is in a range of from 10 μm to about 16 μm, for example 13-14 μm, and the d10 refers to a length measurement, above which the pore sizes of 90% of the pores lie and below which the pore sizes of the remaining 10% of the pores lie, based on the statistical distribution of all the pores is about 7 μm. In specific embodiments, the d90 refers to a length measurement, above which the pore sizes of 10% of the pores of the bulk of the honeycomb body (prior to applying any filtration material) lie and below which the pore sizes of the remaining 90% of the pores lie, based on the statistical distribution of all the pores is about 30 μm. In specific embodiments, the mean or average diameter (D50) of the secondary particles or agglomerates is greater than 0.5 microns and less than 5 microns, d90 greater than 1 microns and less than 5 microns and d10 greater than 0.3 microns and less than 2 microns, for example about 2 microns. In specific embodiments, it has been determined that when the agglomerate mean size D50 and the mean wall pore size of the bulk honeycomb body d50 is such that there is a ratio of agglomerate mean size D50 to mean wall pore size of the bulk honeycomb body d50 is in a range of from 5:1 to 16:1, excellent filtration efficiency results and low pressure drop results are achieved. In more specific embodiments, a ratio of agglomerate mean size D50 to mean wall pore size of the bulk of honeycomb body d50 (prior to applying any filtration material) is in a range of from 6:1 to 16:1, 7:1 to 16:1, 8:1 to 16:1, 9:1 to 16:1, 10:1 to 16:1, 11:1 to 16:1 or 12:1 to 6:1 provide excellent filtration efficiency results and low pressure drop results.

In some embodiments, the bulk of the honeycomb body may have bulk porosities, not counting a coating, of from greater than or equal to 50% to less than or equal to 75% as measured by mercury intrusion porosimetry. Other methods for measuring porosity include scanning electron microscopy (SEM) and X-ray tomography, these two methods in particular are valuable for measuring surface porosity and bulk porosity independent from one another. In one or more embodiments, the bulk porosity of the honeycomb body may be in a range of from about 50% to about 75%, in a range of from about 50% to about 70%, in a range of from about 50% to about 65%, in a range of from about 50% to about 60%, in a range of from about 50% to about 58%, in a range of from about 50% to about 56%, or in a range of from about 50% to about 54%, for example.

In one or more embodiments, the surface portion of the honeycomb body has a surface median pore size from greater than or equal to 7 μm to less than or equal to 20 μm, such as from greater than or equal to 8 μm to less than or equal to 15 μm, or from greater than or equal to 10 μm to less than or equal to 14 μm. For example, in some embodiments, the surface of the honeycomb body may have surface median pore sizes of about 8 μm, about 9 μm, about 10 μm, about 11 μm, about 12 μm, about 13 μm, about 14 μm, or about 15 μm.

In some embodiments, the surface of the honeycomb body may have surface porosities, prior to application of a filtration material deposit, of from greater than or equal to 35% to less than or equal to 75% as measured by mercury intrusion porosimetry, SEM, or X-ray tomography. In one or more embodiments, the surface porosity of the honeycomb body may be less than 65%, such as less than 60%, less than 55%, less than 50%, less than 48%, less than 46%, less than 44%, less than 42%, less than 40%, less than 48%, or less than 36% for example.

Figure 9:
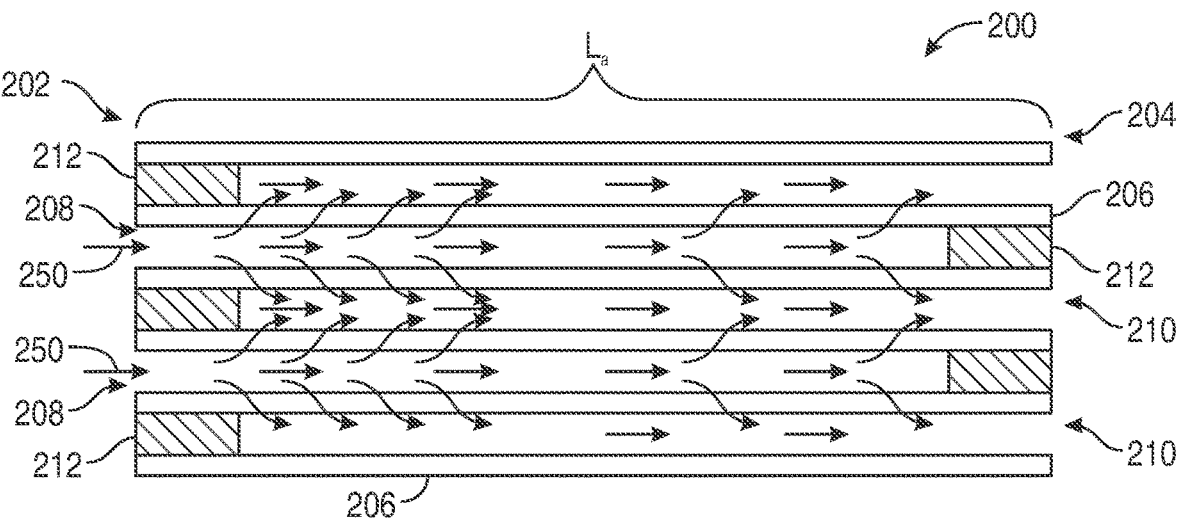
FIG. 9 is a cross-sectional longitudinal view of the particulate filter shown in FIG. 8.

Referring now to FIGS. 8 and 9, a honeycomb body in the form of a particulate filter 200 is schematically depicted. The particulate filter 200 may be used as a wall-flow filter to filter particulate matter from an exhaust gas stream 250, such as an exhaust gas stream emitted from a gasoline engine, in which case the particulate filter 200 is a gasoline particulate filter. The particulate filter 200 generally comprises a honeycomb body having a plurality of channels 201 or cells which extend between an inlet end 202 and an outlet end 204, defining an overall length La (shown in FIG. 9). The channels 201 of the particulate filter 200 are formed by, and at least partially defined by a plurality of intersecting channel walls 206 that extend from the inlet end 202 to the outlet end 204. The particulate filter 200 may also include a skin layer 205 surrounding the plurality of channels 201. This skin layer 205 may be extruded during the formation of the channel walls 206 or formed in later processing as an after-applied skin layer, such as by applying a skinning cement to the outer peripheral portion of the channels.

An axial cross section of the particulate filter 200 of FIG. 8 is shown in FIG. 9. In some embodiments, certain channels are designated as inlet channels 208 and certain other channels are designated as outlet channels 210. In some embodiments of the particulate filter 200, at least a first set of channels may be plugged with plugs 212. Generally, the plugs 212 are arranged proximate the ends (i.e., the inlet end or the outlet end) of the channels 201. The plugs are generally arranged in a pre-defined pattern, such as in the checkerboard pattern shown in FIG. 8, with every other channel being plugged at an end. The inlet channels 208 may be plugged at or near the outlet end 204, and the outlet channels 210 may be plugged at or near the inlet end 202 on channels not corresponding to the inlet channels, as depicted in FIG. 9. Accordingly, each cell may be plugged at or near one end of the particulate filter only.

While FIG. 8 generally depicts a checkerboard plugging pattern, it should be understood that alternative plugging patterns may be used in the porous ceramic honeycomb article. In the embodiments described herein, the particulate filter 200 may be formed with a channel density of up to about 600 channels per square inch (cpsi). For example, in some embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 206 of the particulate filter 200 may have a thickness of greater than about 4 mils (101.6 microns). For example, in some embodiments, the thickness of the channel walls 206 may be in a range from about 4 mils up to about 30 mils (762 microns). In some other embodiments, the thickness of the channel walls 206 may be in a range from about 7 mils (177.8 microns) to about 20 mils (508 microns).

In some embodiments of the particulate filter 200 described herein the channel walls 206 of the particulate filter 200 may have a bare open porosity (i.e., the porosity before any coating is applied to the honeycomb body) % $P \geq 35\%$ prior to the application of any coating to the particulate filter 200. In some embodiments the bare open porosity of the channel walls 206 may be such that $40\% \leq \% P \leq 75\%$. In other embodiments, the bare open porosity of the channel walls 206 may be such that $45\% \leq \% P \geq 75\%$, $50\% \leq \% P \geq 75\%$, $55\% \leq \% P \leq 75\%$, $60\% \leq \% P \leq 75\%$, $45\% \leq \% P \leq 70\%$, $50\% \leq \% P \leq 70\%$, $55\% \leq \% P \leq 70\%$, or $60\% \leq \% P \leq 70\%$.

Further, in some embodiments, the channel walls 206 of the particulate filter 200 are formed such that the pore distribution in the channel walls 206 has a median pore size of ≤30 microns prior to the application of any coatings (i.e., bare). For example, in some embodiments, the median pore size may be ≥8 microns and less than or ≤30 microns. In other embodiments, the median pore size may be ≥10 microns and less than or ≤30 microns. In other embodiments, the median pore size may be ≥10 microns and less than or ≤25 microns. In some embodiments, particulate filters produced with a median pore size greater than about 30 microns have reduced filtration efficiency while with particulate filters produced with a median pore size less than about 8 microns may be difficult to infiltrate the pores with a washcoat containing a catalyst. Accordingly, in some embodiments, it is desirable to maintain the median pore size of the channel wall in a range of from about 8 microns to about 30 microns, for example, in a range of rom 10 microns to about 20 microns.

In one or more embodiments described herein, the honeycomb body of the particulate filter 200 is formed from a metal or ceramic material such as, for example, cordierite, silicon carbide, aluminum oxide, aluminum titanate or any other ceramic material suitable for use in elevated temperature particulate filtration applications. For example, the particulate filter 200 may be formed from cordierite by mixing a batch of ceramic precursor materials which may include constituent materials suitable for producing a ceramic article which predominately comprises a cordierite crystalline phase. In general, the constituent materials suitable for cordierite formation include a combination of inorganic components including talc, a silica-forming source, and an alumina-forming source. The batch composition may additionally comprise clay, such as, for example, kaolin clay. The cordierite precursor batch composition may also contain organic components, such as organic pore formers, which are added to the batch mixture to achieve the desired pore size distribution. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and an aqueous vehicle, such as water or a suitable solvent. The processing aids are added to the batch mixture to plasticize the batch mixture and to generally improve processing, reduce the drying time, reduce cracking upon firing, and/or aid in producing the desired properties in the honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In some embodiments, the batch composition may include one or more optional forming or processing aids such as, for example, a lubricant which assists in the extrusion of the plasticized batch mixture. Exemplary lubricants can include tall oil, sodium stearate or other suitable lubricants.

After the batch of ceramic precursor materials is mixed with the appropriate processing aids, the batch of ceramic precursor materials is extruded and dried to form a green honeycomb body comprising an inlet end and an outlet end with a plurality of channel walls extending between the inlet end and the outlet end. Thereafter, the green honeycomb body is fired according to a firing schedule suitable for producing a fired honeycomb body. At least a first set of the channels of the fired honeycomb body are then plugged in a predefined plugging pattern with a ceramic plugging composition and the fired honeycomb body is again fired to ceram the plugs and secure the plugs in the channels.

Figure 10:
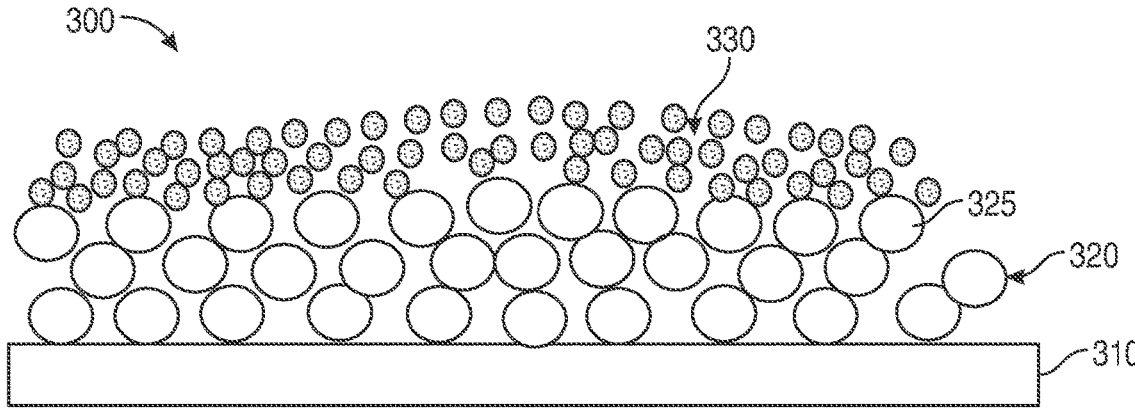
FIG. 10 schematically depicts a wall of a honeycomb body with particulate loading.

In various embodiments the honeycomb body is configured to filter particulate matter from a gas stream, for example, an exhaust gas stream from a gasoline engine. Accordingly, the median pore size, porosity, geometry and other design aspects of both the bulk and the surface of the honeycomb body are selected taking into account these filtration requirements of the honeycomb body. As an example, and as shown in the embodiment of FIG. 10, a wall 310 of the honeycomb body 300, which can be in the form of the particulate filter as shown in FIGS. 8 and 9, has filtration material deposits 320 disposed thereon, which in some embodiments is sintered or otherwise bonded by heat treatment. The filtration material deposits 320 comprise particles 325 that are deposited on the wall 310 of the honeycomb body 300 and help prevent particulate matter from exiting the honeycomb body along with the gas stream 330, such as, for example, soot and/or ash, and to help prevent the particulate matter from clogging the base portion of the walls 310 of the honeycomb body 300. In this way, and according to embodiments, the filtration material deposits 320 can serve as the primary filtration component while the base portion of the honeycomb body can be configured to otherwise minimize pressure drop for example as compared to honeycomb bodies without such filtration material deposits. The filtration material deposits are delivered by the aerosol deposition methods disclosed herein.

As mentioned above, the material, which in some portions or some embodiments may be an inorganic layer, on walls of the honeycomb body is very thin compared to thickness of the base portion of the walls of the honeycomb body. As will be discussed in further detail below, the material, which may be an inorganic layer, on the honeycomb body can be formed by methods that permit the deposited material to be applied to surfaces of walls of the honeycomb body in very thin applications or in some portions, layers. In embodiments, the average thickness of the material, which may be deposit regions or an inorganic layer, on the base portion of the walls of the honeycomb body is greater than or equal to 0.5 μm and less than or equal to 50 μm, or greater than or equal to 0.5 μm and less than or equal to 45 μm, greater than or equal to 0.5 μm and less than or equal to 40 μm, or greater than or equal to 0.5 μm and less than or equal to 35 μm, or greater than or equal to 0.5 μm and less than or equal to 30 μm, greater than or equal to 0.5 μm and less than or equal to 25 μm, or greater than or equal to 0.5 μm and less than or equal to 20 μm, or greater than or equal to 0.5 μm and less than or equal to 15 μm, greater than or equal to 0.5 μm and less than or equal to 10 μm.

As discussed above, the deposited material, which may in some portions or some embodiments be an inorganic layer, can be applied to the walls of the honeycomb body by methods that permit the inorganic material, which may be an inorganic layer, to have a small median pore size. This small median pore size allows the material, which may be an inorganic layer, to filter a high percentage of particulate and prevents particulate from penetrating honeycomb and settling into the pores of the honeycomb. The small median pore size of material, which may be an inorganic layer, according to embodiments increases the filtration efficiency of the honeycomb body. In one or more embodiments, the material, which may be an inorganic layer, on the walls of the honeycomb body has a median pore size from greater than or equal to 0.1 μm to less than or equal to 5 μm, such as from greater than or equal to 0.5 μm to less than or equal to 4 μm, or from greater than or equal to 0.6 μm to less than or equal to 3 μm. For example, in some embodiments, the material, which may be an inorganic layer, on the walls of the honeycomb body may have median pore sizes of about 0.5 μm, about 0.6 μm, about 0.7 μm, about 0.8 μm, about 0.9 μm, about 1 μm, about 2 μm, about 3 μm, or about 4 μm.

Although the deposited material, which may be an inorganic layer, on the walls of the honeycomb body may, in some embodiments, cover substantially 100% of the wall surfaces defining inner channels of the honeycomb body, in other embodiments, the material, which may be an inorganic layer, on the walls of the honeycomb body covers less than substantially 100% of the wall surfaces defining inner channels of the honeycomb body. For instance, in one or more embodiments, the deposited material, which may be an inorganic layer, on the walls of the honeycomb body covers at least 70% of the wall surfaces defining inner channels of the honeycomb body, covers at least 75% of the wall surfaces defining inner channels of the honeycomb body, covers at least 80% of the wall surfaces defining inner channels of the honeycomb body, covers at least 85% of the wall surfaces defining inner channels of the honeycomb body, covers at least 90% of the wall surfaces defining inner channels of the honeycomb body, or covers at least 85% of the wall surfaces defining inner channels of the honeycomb body.

As described above with reference to FIGS. 9 and 9, the honeycomb body can have a first end and second end. The first end and the second end are separated by an axial length. In some embodiments, the filtration material deposits on the walls of the honeycomb body may extend the entire axial length of the honeycomb body (i.e., extends along 100% of the axial length). However, in other embodiments, the material, which may be an inorganic layer, on the walls of the honeycomb body extends along at least 60% of the axial length, such as extends along at least 65% of the axial length, extends along at least 70% of the axial length, extends along at least 75% of the axial length, extends along at least 80% of the axial length, extends along at least 85% of the axial length, extends along at least 90% of the axial length, or extends along at least 95% of the axial length.

In embodiments, the material, which may in some portions or some embodiments be an inorganic layer, on the walls of the honeycomb body extends from the first end of the honeycomb body to the second end of the honeycomb body. In some embodiments, the material, which may be an inorganic layer, on the walls of the honeycomb body extends the entire distance from the first surface of the honeycomb body to the second surface of the honeycomb body (i.e., extends along 100% of a distance from the first surface of the honeycomb body to the second surface of the honeycomb body). However, in one or more embodiments, the layer or material, which may be an inorganic layer, on the walls of the honeycomb body extends along 60% of a distance between the first surface of the honeycomb body and the second surface of the honeycomb body, such as extends along 65% of a distance between the first surface of the honeycomb body and the second surface of the honeycomb body, extends along 70% of a distance between the first surface of the honeycomb body and the second surface of the honeycomb body, extends along 75% of a distance between the first surface of the honeycomb body and the second surface of the honeycomb body, extends along 80% of a distance between the first surface of the honeycomb body and the second surface of the honeycomb body, extends along 85% of a distance between the first surface of the honeycomb body and the second surface of the honeycomb body, extends along 90% of a distance between the first surface of the honeycomb body and the second surface of the honeycomb body, or extends along 95% of a distance between the first surface of the honeycomb body and the second surface of the honeycomb body.

The selection of a honeycomb body having a low pressure drop in combination with the low thickness and porosity of the filtration material on the honeycomb body according to embodiments allows a honeycomb body of embodiments to have a low initial pressure drop when compared to other honeycomb bodies. In embodiments, the loading of the layer is in a range of from 0.3 to 30 g/L on the honeycomb body, such as in a range of from 1 to 30 g/L on the honeycomb body, or in a range of from 3 to 30 g/L on the honeycomb body. In other embodiments, the loading of the layer is in a range of from 1 to 20 g/L on the honeycomb body, such as in a range of from 1 to 10 g/L on the honeycomb body. In specific embodiments, the loading of the layer is in a range of from 1 to 9 g/L, 1 to 8 g/L, 1 to 7 g/L, 1 to 8 g/L, 1 to 5 g/L, 1 to 4 g/L, 1 to 3 g/L, 2 to 10 g/L, 2 to 9 g/L, 2 to 8 g/L, 2 to 7 g/L, 2 to 6 g/L, 2 to 5 g/L, 2 to 4 g/L, 3 to 10 g/L, 3 to 9 g/L, 3 to 8 g/L, 3 to 7 g/L, 3 to 6 g/L, 3 to 5 g/L, 4 to 10 g/L, 4 to 9 g/L 4 to 8 g/L, 4 to 7 g/L, or 4 to 6 g/L on the honeycomb body. In some embodiments, the increase in pressure drop across the honeycomb due to the application of the porous layer across is less than 20% of the uncoated honeycomb. In other embodiments that increase can be less than or equal to 9%, or less than or equal to 8%. In other embodiments, the pressure drop increase across the honeycomb body is less than or equal to 7%, such as less than or equal to 6%. In still other embodiments, the pressure drop increase across the honeycomb body is less than or equal to 5%, such as less than or equal to 4%, or less than or equal to 3%.

Without being bound to any particular theory, it is believed that small pore sizes in the filtration material deposits on the walls of the honeycomb body allow the honeycomb body to have good filtration efficiency even before ash or soot build-up occurs in the honeycomb body. The filtration efficiency of honeycomb bodies is measured herein using the protocol outlined in Tandon et al., 65 CHEMICAL ENGINEERING SCIENCE 4751-60 (2010). As used herein, the initial filtration efficiency of a honeycomb body refers to a new or regenerated honeycomb body that does not comprise any measurable soot or ash loading. In embodiments, the initial filtration efficiency (i.e., clean filtration efficiency) of the honeycomb body is greater than or equal to 70%, such as greater than or equal to 80%, or greater than or equal to 85%. In yet other embodiments, the initial filtration efficiency of the honeycomb body is greater than 90%, such as greater than or equal to 93%, or greater than or equal to 95%, or greater than or equal to 98%.

The material, which is in some embodiments an inorganic filtration material, on the walls of the honeycomb body according to embodiments is thin and has a porosity, and in some embodiments also has good chemical durability and physical stability. The chemical durability and physical stability of the filtration material deposits on the honeycomb body can be determined, in embodiments, by subjecting the honeycomb body to test cycles comprising burn out cycles and an aging test and measuring the initial filtration efficiency before and after the test cycles. For instance, one exemplary method for measuring the chemical durability and the physical stability of the honeycomb body comprises measuring the initial filtration efficiency of a honeycomb body; loading soot onto the honeycomb body under simulated operating conditions; burning out the built up soot at about 650° C.; subjecting the honeycomb body to an aging test at 1050° C. and 10% humidity for 12 hours; and measuring the filtration efficiency of the honeycomb body. Multiple soot build up and burnout cycles may be conducted. A small change in filtration efficiency ($\Delta$FE) from before the test cycles to after the test cycles indicates better chemical durability and physical stability of the filtration material deposits on the honeycomb body. In some embodiments, the $\Delta$FE is less than or equal to 5%, such as less than or equal to 4%, or less than or equal to 3%. In other embodiments, the $\Delta$FE is less than or equal to 2%, or less than or equal to 1%.

In some embodiments, the filtration material deposits on the walls of the honeycomb body may be comprised of one or a mixture of ceramic components, such as, for example, ceramic components selected from the group consisting of $SiO_2$, $Al_2O_3$, MgO, $ZrO_2$, CaO, $TiO_2$, $CeO_2$, $Na_2O$, Pt, Pd, Ag, Cu, Fe, Ni, and mixtures thereof. Thus, the filtration material deposits on the walls of the honeycomb body may comprise an oxide ceramic. As discussed in more detail below, the method for forming the filtration material deposits on the honeycomb body according to embodiments can allow for customization of the filtration material composition for a given application. This may be beneficial because the ceramic components may be combined to match, for example, the physical properties—such as, for example coefficient of thermal expansion (CTE) and Young's modulus, etc.—of the honeycomb body, which can improve the physical stability of the honeycomb body. In some embodiments, the filtration material deposits on the walls of the honeycomb body may comprise cordierite, aluminum titanate, enstatite, mullite, forsterite, corundum (SiC), spinel, sapphirine, and periclase.

In some embodiments, the composition of the filtration material deposits on the walls of the honeycomb body is the same as the composition of the honeycomb body. However, in other embodiments, the composition of the filtration material is different from the composition of the walls of the matrix of the honeycomb body.

The properties of the filtration material deposits and, in turn, the honeycomb body overall are attributable to the ability of applying a sparse or thin porous filtration material having small median pore sizes relative to the host honeycomb body.

In some embodiments, the method of forming a honeycomb body comprises forming or obtaining a mixture or a suspension that comprises a ceramic precursor material and a solvent. The ceramic precursor material of the filtration material precursor comprises ceramic materials that serve as a source of, for example, $SiO_2$, $Al_2O_3$, $TiO_2$, MgO, $ZrO_2$, CaO, $CeO_2$, $Na_2O$, Pt, Pd, Ag, Cu, Fe, Ni, and the like.

In one or more embodiments, the suspension is atomized with an atomizing gas to form liquid-particulate-binder-adhesion promoter droplets comprised of the aqueous vehicle, the binder material, and the particles, is directed to a honeycomb body, Agglomerates formed upon removal or evaporation of the aqueous vehicle are then deposited on the honeycomb body. In some embodiments, the honeycomb body may have one or more of the channels plugged on one end, such as, for example, the first end of the honeycomb body during the deposition of the aerosol to the honeycomb body. The plugged channels may, in some embodiments, be removed after deposition of the aerosol. But, in other embodiments, the channels may remain plugged even after deposition of the aerosol. The pattern of plugging channels of the honeycomb body is not limited, and in some embodiments all the channels of the honeycomb body may be plugged at one end. In other embodiments, only a portion of the channels of the honeycomb body may be plugged at one end. In such embodiments, the pattern of plugged and unplugged channels at one end of the honeycomb body is not limited and may be, for example, a checkerboard pattern where alternating channels of one end of the honeycomb body are plugged. By plugging all or a portion of the channels at one end of the honeycomb body during deposition of the aerosol, the aerosol may be evenly distributed within the channels of the honeycomb body.

According to one or more embodiments, binders with high temperature (e.g., greater than 400° C.) resistance are included in the agglomerates and filtration material deposits to enhance integrity of the agglomerates and deposits even at high temperatures encountered in exhaust gas emissions treatment systems. In specific embodiments, a filtration material can comprise about 5 to 25 wt % alkoxy-siloxane resin. The microstructure of the filtration material deposits was similar to the as-deposited morphology after the various tests described below. Inorganic binders could also be used in one or more embodiments. The filtration efficiency of both samples was higher than 60% after the high flow blowing test, a high flow test at 850 $Nm^3/h$. The tests demonstrated that the binders, including organic and inorganic binders, caused the primary particles to bind together to form secondary particles (also called agglomerates), which were bound to the filter walls, even when exposed to high temperatures encountered in engine exhaust gas streams. According to one or more embodiments, other inorganic and organic binders such as silicate, phosphate (e.g. $AlPO_4$, $AlH_2(PO_4)_3$), sol (e.g. $mSiO_2 \cdot nH_2O$, $Al(OH)_x \cdot (H_2O)_{6-x}$) and alkoxides, could also be utilized, for example to increase mechanical strength by an appropriate curing process.

Aqueous-Based Methods

According to one or more embodiments, a method of aqueous-based aerosol deposition of inorganic material on porous walls of a plugged honeycomb body are disclosed.

The porous walls of the plugged honeycomb body form a plurality of channels in the honeycomb body. In specific embodiments, an aqueous-based suspension of inorganic material and binder and adhesion promoter passes through a nozzle and provides a flow of aerosol particles after contact with a gas stream and heat before being forced into the opening channels of the honeycomb body. A layer of inorganic material is then deposited on the porous walls with some agglomerates or inorganic material getting into pores. An off-line heat treatment process may be applied for curing of the layer, which in some embodiments forms a membrane. According to one or more embodiments, the honeycomb bodies made and described herein, both before and after curing, exhibit significantly higher filtration efficiency and/or better FE/dP trade-off than bare honeycomb body substrate parts.

Figure 11:
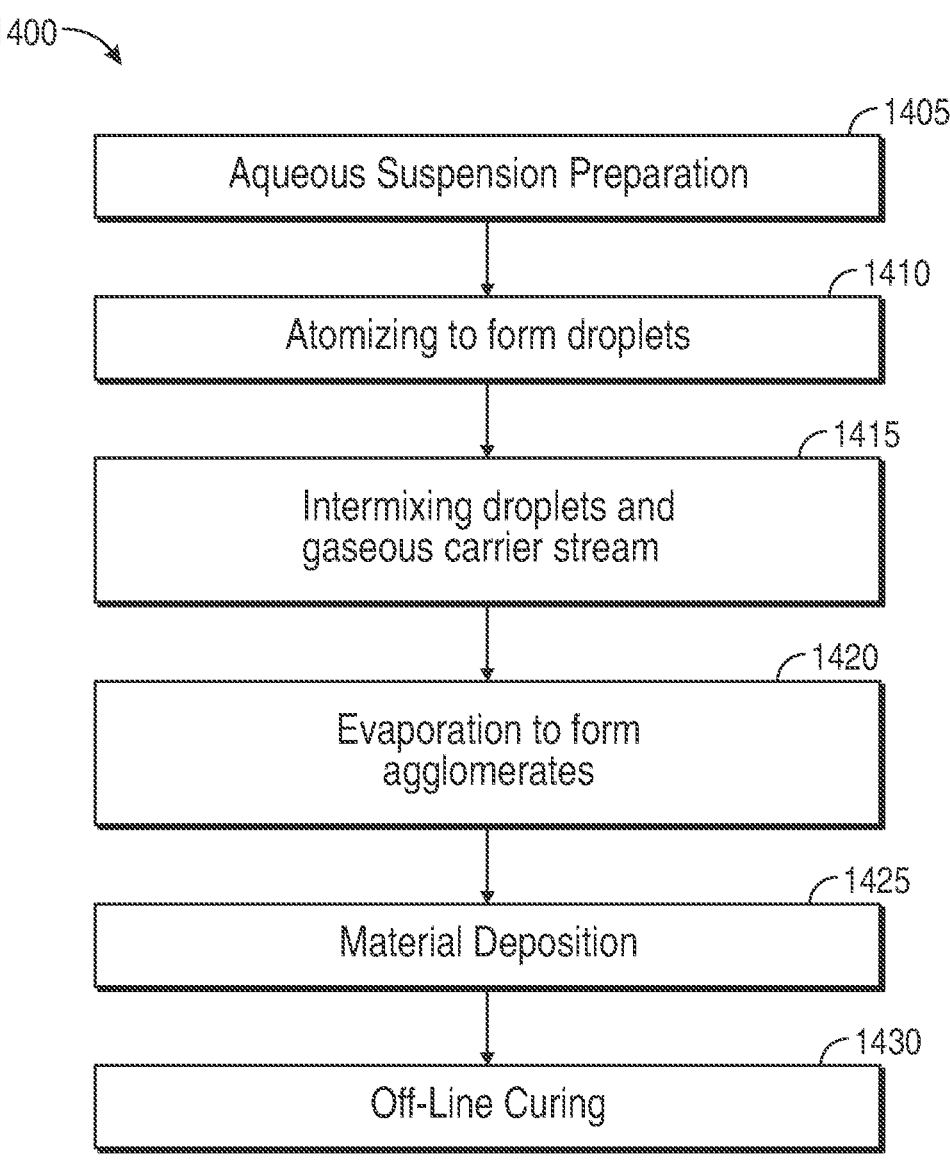
FIG. 11 is a flowchart depicting an exemplary embodiment of an aqueous-based process of forming material according to embodiments disclosed herein.

Referring now to FIG. 11, according to one or more embodiments, a process 4100 comprises the steps of aqueous suspension preparation 1405, atomizing to form droplets 1410, intermixing droplets and a gaseous carrier stream 1415; evaporating liquid vehicle to form agglomerates 1420, depositing of material, e.g., agglomerates, on the walls of a wall-flow filter 1425, and optional post-treatment 1430 to, for example off-line curing, bind the material on, or in, or both on and in, the porous walls of the honeycomb body. Aerosol deposition methods form of agglomerates comprising a binder, for example, an alkali-free binder and adhesion promoter can provide a high mechanical integrity even without any high temperature curing steps (e.g., heating to temperatures in excess of 1000° C.), and in some embodiments even higher mechanical integrity after an optional off-line curing step such as a high temperature (e.g., heating to temperatures in excess of 1000° C.) curing step. In one or more embodiments, "off-line" refers to a curing process that is performed separately form the aerosol deposition apparatus, such as in a separate apparatus.

In one or more embodiments, stable aqueous-based inorganic material suspension or slurry is made by mixing powder of inorganic material (e.g., alumina) with deionized water and an aqueous-based alkali free binder and an adhesion promoter. In some embodiments, such a suspension is made by diluting a commercially available aqueous-based organic matter suspension (e.g., aqueous-based alumina suspension with deionized water) and then adding an alkali free aqueous-based binder and an adhesion promoter. In some embodiments, it may be desirable to add a dispersant. The inorganic material is in the form of particles that are spherical, rod-like, flat or irregular with the primary particle size of 30 nm to 500 nm. The concentration of the inorganic material according to one or more embodiments is varied in the range of 1% to 20% by weight of the suspension. Exemplary ranges of inorganic material in weight % are 1-2%, 1-3%, 1-4%, 1-5%, 1-6%, 1-8%, 1-9%, 1-10%, 1-15%, 1-20%, 2-3%, 2-4%, 2-5%, 2-6%, 2-8%, 2-9%, 2-10%, 2-15%, 2-20%, 3-4%, 3-5%, 3-6%, 3-8%, 3-9%, 3-10%, 3-15%, 3-20%, 4-5%, 4-6%, 4-8%, 4-9%, 4-10%, 4-15%, 4-20%, 5-6%, 5-8%, 5-9%, 5-10%, 5-15%, 5-20%, 10-15%, 10-16%, 10-17%, 10-18%, 10-19%, 10-20%, 15-18%, 15-19% and 15-20%. In one or more embodiments, the binder comprises inorganic or organic materials. Non-limiting examples of inorganic binders include silica, titania, silicates, aluminates, phosphate, hydraulic cement or alkali-free hydraulic cement. Non-limiting examples of alkali-free organic binders include silicone resin, polyvinyl alcohol (PVA) or polyethylene glycol (PEG). The concentration of the binder may be in the range of 5%-100% by weight of alumina. Exemplary ranges of binder by weight of inorganic material in weight % are 5-100%, 10-100%, 15-100%, 20-100%, 25-100%, 30-100%, 35-100%, 40-100%, 45-100%, 50-100%, 55-100%, 60-100%, 5-90%, 10-90%, 15-90%, 20-90%, 25-90%, 30-90%, 35-90%, 40-90%, 45-90%, 50-90%, 55-90%, 60-90%, 5-80%, 10-80%, 15-80%, 20-80%, 25-80%, 30-80%, 35-80%, 40-80%, 45-80%, 50-80%, 55-80%, 60-80%, 5-70%, 10-70%, 15-70%, 20-70%, 25-70%, 30-70%, 35-70%, 40-70%, 45-70%, 50-70%, 55-70%, 60-70%, 5-60%, 10-60%, 15-60%, 20-60%, 25-60%, 30-60%, 35-60%, 40-60%, 45-60%, 50-60%, 55-60%, 5-50%, 10-50%, 15-50%, 20-50%, 25-50%, 30-50%, 35-50%, 40-50%, 45-50%, 5-40%, 10-40%, 15-40%, 20-40%, 25-40%, 30-40%, 35-40%, 5-30%, 10-30%, 15-30%, 20-30%, 25-30%, 5-25%, 10-25%, 15-25%, 20-25%, 1-20%, 2-20%, 3-20%, 4-20% 5-20%, 6-20%, 7-20%, 8-20%, 9-20%, 10-20%, 1-15%, 2-15%, 3-15%, 4-15% 5-15%, 6-15%, 7-15%, 8-15%, 9-15%, 10-15%, 1-10%, 2-10%, 3-10%, 4-10%, 5-10%, 6-10%, 7-10% and 8-10%. In one or more embodiments, mixing is performed mechanically or acoustically. The as-prepared suspension according to some embodiments is stable for at least 1 hour without clear settlement.

In some embodiments, a tape test may be used to roughly evaluate effectiveness of different binders and to decide the amount of binders to be added in the suspension. A layer of wet coating of a sample suspension is prepared according to embodiments described herein and then is applied on one microscope slide with use of as-prepared inorganic material suspension. After drying, the coated slide is placed in the oven and heated to curing temperature for a period of time in the range of 10 minutes up to 2 hours. Curing temperature and profile will depend on the binder used. After curing, a piece of regular tape such as Highland™ transparent tape is pressed against the cured coating, and then is lifted off from the coating. According to some embodiments, if particles of inorganic material are observed on the tape, the cohesive strength of the cured suspension is not acceptable. More binder or a different binder can be used, and the test can be repeated.

FIG. 4, discussed above, illustrates a schematic of a deposition system that can be used for aerosol deposition an aqueous-based suspension containing inorganic material according to one or more embodiments. In FIG. 4, the suspension is contained in a suspension container 902, and liquid pressure was applied and controlled by a gas supply 902, which in some embodiments is in the form of a cylinder. In one or more embodiments, pressure is controlled by a digital automatic pressure regulator or a piezo actuator valve. Atomization gas according to one or more embodiments comprises nitrogen or air. A first heat source 906a heats carrier gas 905a that enters the first plenum space 903. A second heat source 906b is positioned downstream from the nozzle 920 to heat the suspension 910 that is atomized in the nozzle 920. A third heat source 906c is positioned in the evaporation chamber 923, and the outlet flow of the nozzle and the primary carrier gas 905a enter the evaporation chamber 923 of the evaporation section 953.

In one or more embodiments, an aqueous-based aerosol deposition process and products made thereby are provided, which provide plugged honeycomb bodies comprising porous walls and inorganic material deposited thereon exhibiting significantly higher filtration efficiency and minimal backpressure penalty than those prepare by other methods. Such honeycomb bodies in some embodiments exhibit higher durability in certain tests described further below, including a vibration test, a vehicle test and water durability tests.

In specific embodiments, a process is provided comprising flowing an aqueous suspension of inorganic material (e.g., alumina nanoparticles) in a suspension comprising a binder, for example, an alkali-free binder comprising and an adhesion promoter through a spray nozzle to provide a flow of aerosol particles which form agglomerates after contact with a drying gas stream. In specific embodiments, the agglomerates are then forced into the opening channels of plugged honeycomb bodies and on and/or in the surface of porous walls which form the channels. In some embodiments, the agglomerates contact surface pores first. In one or more embodiments, an off-line heat treatment process is utilized for binder curing and deposit strengthening. After deposition and thermal treatment, the filter parts show improved filtration efficiency or FE/dP trade-off performance compared to bare plugged honeycomb bodies. The plugged honeycomb bodies made according to the methods made herein pass various durability tests including water resistance tests with a thermal treatment. A water soluble binder or aqueous-compatible binder is used according to one or more embodiments. The aqueous process according to one or more embodiments forms deposits having a microstructure of densely packed agglomerates.

According to one or more embodiments, the aqueous-based process provides a less complex and less expensive process than an ethanol-based process. In some embodiments, lower deposited loading by an aqueous-based process results in similar FE/dP performance compared to an ethanol-based process, which results in lower materials cost, shorter deposition time, and higher production rate. In some embodiments, higher FE could be achieved with the same loading compared to the ethanol-based process. In some embodiments, the morphology of the deposited inorganic material can be adjusted to be similar for an ethanol-based process and an aqueous based process.

Plugged Honeycomb Bodies Comprising Inorganic Material

Embodiments of the disclosure pertain to plugged honeycomb bodies comprising porous walls and inorganic material deposited on or in or both on and in the porous walls, which provide a filtration article configured to filter particulate from an exhaust gas stream. In specific embodiments, the filtration article comprises a gasoline particulate filters (GPF) used to remove particulates from gasoline engine exhaust gases. Exhaust gas to be filtered enters inlet cells and passes through the cell walls to exit the filter via outlet channels, with the particulates being trapped on or within the inlet cell walls as the gas traverses and then exits the filter. According to one or more embodiments, porous walls of the filtration article having inorganic material deposited on or in or both on and in the porous walls provide improved filtration efficiency and excellent durability, including durability when exposed to water.

In one or more embodiments the inorganic material comprises particulate or primary particles of inorganic material (e.g. alumina), particulate-binder-adhesion promoter agglomerates (referred to as "agglomerates") comprised of the particles and the binder and the adhesion promoter, and aggregates of particulate-binder-adhesion promoter agglomerates. In one or more embodiments, the "particulate" or "primary particle" refers to the smallest discrete mass of inorganic material. In one or more embodiments, "agglomerate" refers to a mass of primary particles or particulate and binder and adhesion promoter, wherein the primary particles or particulate are held together by the binder and the adhesion promoter. In one or more embodiments, "aggregates of particulate-binder-adhesion promoter agglomerates" or "aggregates of primary particle-binder agglomerates" (referred to as "aggregates") refers to a clustered mass of individual particulate-binder-adhesion promoter agglomerates or primary particle-binder agglomerates, which are held together by the binder and adhesion promoter. In one or more embodiments, some of the aggregates and individual, for example, non-aggregated, agglomerates are deposited onto the porous walls of the honeycomb filter body. In one or more embodiments, at least a portion of the primary particles or the particulate are present in, on or both in and on the porous walls as discrete masses that are not part of agglomerate or aggregate. In one or more embodiments, at least a portion of the particulate-binder-adhesion promoter agglomerates or the primary particle-binder agglomerates are present in, on or in and on the porous walls as discrete masses that are not part of an aggregate.

In one or more embodiments, the inorganic material in or on or in and one the porous walls of the filtration article in the form of a plugged honeycomb body is present "clusters" or "chains" of agglomerates and/or aggregates. In some embodiments, the cluster or chains provide an inorganic material morphology that is one or more of finger-shaped, fibril-shaped, or sponge-like, such as for example, a morphology resembling a sea wool sponge.

As discussed herein, according to embodiments, the inorganic material is formed from a suspension comprised of nanoparticles (e.g., inorganic particles, ceramic particles, refractory particles, alumina particles, etc.), binder (e.g., a silicon-containing binder and/or an aqueous binder, adhesion promoter and liquid vehicle (e.g., an alcohol or water). The suspension is delivered to a nozzle which sprays droplets of the suspension with a gas flow assist. The liquid vehicle is evaporated from the droplets to form spherical agglomerates of the nanoparticles. The binder and the adhesion promoter serve as one or more of an agglomerate promoter, an aggregate promoter, a chain promoter and a cluster promoter. Some spherical agglomerates are conveyed to the porous ceramic walls and lodge either on the surface of the porous ceramic walls (on, in, or over surface pores present on the walls), or in pores inside the porous ceramic walls (below the surface of the porous ceramic walls), or into contact with other previously deposited agglomerates which are disposed either in or on the porous ceramic walls, so as to form aggregates of spherical agglomerates therein, or thereon. Other spherical agglomerates come into contact with still other spherical agglomerates while being conveyed toward the honeycomb filter body so as to form aggregates of spherical agglomerates, wherein the aggregates are then conveyed toward the porous ceramic walls and the aggregates then lodge either on the surface of the porous ceramic walls (on, in, or over surface pores present on the walls), or in pores inside the porous ceramic walls (below the surface of the porous ceramic walls), or into contact with other previously deposited agglomerates or aggregates which are disposed either in or on the porous ceramic walls, so as to form aggregates of spherical agglomerates therein, or thereon.

Thus, according to one or more embodiments, the inorganic deposits are comprised of individual agglomerates of nanoparticles (e.g., spherical agglomerates of nanoparticles), aggregates of agglomerates, and/or porous clusters or chains of aggregates of spherical agglomerates, wherein some clusters or chains are disposed within pores in or below the surface of the porous ceramic wall, and/or wherein some clusters are disposed on the surface of the porous ceramic wall. In some embodiments, some of the porous clusters are porous clusters or cluster islands comprising exposed aggregates of agglomerates (e.g., spherical agglomerates). In some embodiments, the porous clusters or cluster islands comprise one or more chains of two or agglomerates, each chain extending in a substantially outward direction from the porous ceramic wall. In some embodiments, a plurality of the outwardly extending chains collectively provides a morphology resembling a member of the group consisting of fingers, tufts, sponges (e.g., a sea wool sponge) and fans. In some embodiments, at least one chain includes a free end of the chain projecting above the surface of the porous ceramic wall. In some embodiments, the inorganic material on the honeycomb body is present as inorganic deposits comprising a network of aggregated spherical agglomerates of inorganic material particles.

In embodiments, the loading of the inorganic material present on the honeycomb body in a range of from 0.3 to 30 g/L on the honeycomb body, such as in a range of from 1 to 30 g/L on the honeycomb body, or in a range of from 3 to 30 g/L on the honeycomb body. In other embodiments, the loading of the inorganic material is in a range of from 1 to 20 g/L on the honeycomb body, such as in a range of from 1 to 10 g/L on the honeycomb body. In specific embodiments, the loading of the inorganic material is in a range of from 1 to 9 g/L, 1 to 8 g/L, 1 to 7 g/L, 1 to 8 g/L, 1 to 5 g/L, 1 to 4 g/L, 1 to 3 g/L, 2 to 10 g/L, 2 to 9 g/L, 2 to 8 g/L, 2 to 7 g/L, 2 to 6 g/L, 2 to 5 g/L, 2 to 4 g/L, 3 to 10 g/L, 3 to 9 g/L, 3 to 8 g/L, 3 to 7 g/L, 3 to 6 g/L, 3 to 5 g/L, 4 to 10 g/L, 4 to 9 g/L 4 to 8 g/L, 4 to 7 g/L, or 4 to 6 g/L on the honeycomb body. Loading of the inorganic material is weight of added material in grams divided by the geometric part volume in liters. The geometric part volume is based on outer dimensions of the honeycomb filter body (or plugged honeycomb body).

In one or more embodiments, the particles of the inorganic material have a surface area in a range of from 5 $m^2$/g to 15 $m^2$/g, 5 $m^2$/g to 14 $m^2$/g, 5 $m^2$/g to 13 $m^2$/g, 5 $m^2$/g to 12 $m^2$/g, 5 $m^2$/g to 12 $m^2$/g, or 5 $m^2$/g to 10 $m^2$/g.

In one or more embodiments the inorganic material deposits on the honeycomb body are free from rare earth oxides such as ceria, lanthana and yttria. In one or more embodiments the inorganic material is free from catalyst, for example, an oxidation catalyst such as a platinum group metal (e.g., platinum, palladium and rhodium) or a selective catalytic reduction catalyst such as a copper, a nickel or an iron promoted molecular sieve (e.g., a zeolite).

In one or more embodiments, prior to heat treatment of the honeycomb body comprising inorganic material on or in or on and in the porous wall, the honeycomb body further comprises a water soluble binder, for example a water soluble silicon-containing binder, an adhesion promoter, a water soluble silicate binder, a water soluble aluminate binder. In one or more embodiments, the binder is present in a range of from 5 wt % to 40 wt %, 5 wt % to 35 wt %, 5 wt % to 30 wt %, 5 wt % to 25 wt %, 5 wt % to 20 wt %,

41

5 wt % to 15 wt % or 5 wt % to 10 wt % based on the weight of the organic material on the honeycomb body. In one or more embodiments, the binder is provided by a precursor binder or precursor binder material. In one or more embodiments, the precursor binder is silicon-containing. In one or more embodiments, the silicon-containing precursor binder is a silicone resin, or a siloxane, or an alkoxysiloxane, or a silicate. In one or more embodiments, the silicon-containing precursor binder is comprised of an inorganic component and an organic component. In one or more embodiments, the silicon-containing precursor binder transitions to silica upon application of heat. In one or more embodiments, the silicon-containing precursor binder is comprised of an inorganic component and an organic component, and wherein upon application of heat the organic component is driven off and the inorganic component transitions to silica.

Examples

Embodiments will be further understood by the following non-limiting examples.

Wall-flow filters. The diameter and length of the wall-flow filter substrates used in the examples were 4.055" and 5.47". The CPSI and wall thickness were 200 and 8 mils. The pore size was 14 microns.

Raw Materials. Unless specified otherwise in the examples, the following raw materials were used. The inorganic material being deposited was alumina, the atomizing gas was nitrogen, and a binder was present. The carrier gas was either air or nitrogen.

Raw Material Utilization. Raw material utilization was determined by determining the weight gain of the honeycomb and comparing that to a calculated amount of ceramic put into the process. For example, if the weight gain was equal to the amount of ceramic put into the process, then the utilization was calculated as 100%; or if the weight gain were only one half of the of ceramic put into the process, the utilization was calculated to be 50%.

According to one or more embodiments, a honeycomb filter body comprising inorganic deposits disposed within the honeycomb filter body to create a filtration article is characterized according to the following tests.

Smoke Filtration Efficiency (Fe)

The smoke filtration efficiency performance of the deposited inorganic material disposed within the honeycomb filter bodies was evaluated using a smoke filtration test.

The filtration efficiency (in percent %) is calculated as:

$$FE = \left(1 - \frac{C_{outlet}}{C_{inlet}}\right) * 100,$$

where C is the smoke concentration on the outlet and inlet side of the part, respectively.

Two particle counter units (Lighthouse 2016, USA) are used simultaneously at upstream and downstream positions with respect to the article at the underfloor position of a dilution chamber. A cigarette is lit in a smoke generator to provide desired quantity of soot particles into the dilution chamber and the concentration is maintained at a certain level (500,000 particles/cm³) before the smoke travels into the inlet side of the tunnel. The flow is driven by a blower which carries the soot particles through the tunnel and eventually into the wall flow filter parts. When the concentration at upstream of GPF reaches a stable state, the two particle counters reset to begin counting for 60 seconds and filtration efficiency (FE) was calculated based on the differential of total particle count of 0.3 μm and above. The pressure drop (dP) measured by pressure gauges located upstream and downstream from the article is also recorded at a fixed flow of 51 Nm³/hr.

Pre-Test Canning. During pre-test canning, an article is wrapped in a ceramic fiber mat material and then placed into a metal can. The article, mat and can assembly are heated in an oven to 650° C. and held at 650° C. for a duration. The mat expands to help hold the article in place within the can. This process is referred to as mat popping as the mat expands, it "pops" inside the can to fit the article in place. The duration of the pre-test canning is chosen based on the subsequent test being conducted.

Post-Test Cleanout. After a test is conducted, the following steps are completed to achieve post-test cleanout of the article. The article, mat and can assembly are placed in an oven at 650° C. and held at 650° C. for a duration, usually about 6 hours so that the soot that was loaded into the article is burned out of the article.

Clean Filtration Efficiency

As used herein, the "clean filtration efficiency" of a honeycomb body or filtration article refers to a new or regenerated honeycomb body that does not comprise any measurable soot loading. In embodiments, the clean filtration efficiency of the honeycomb body or filtration article is greater than or equal to 70%, such as greater than or equal to 80%, or greater than or equal to 85%. In yet other embodiments, the initial filtration efficiency of the honeycomb body or filtration article is greater than 90%, such as greater than or equal to 93%, or greater than or equal to 95%, or greater than or equal to 98%.

As used herein, "Clean Filtration Efficiency Test" refers to testing an article as follows.

After pre-test canning for 6 hours, an air stream is supplied by a blower upstream of the article at a ramped rate, and clean pressure drop is measured across the filter using a differential pressure sensor/gauge at room temperature (about 25° C.). The flow rate of the air stream was ramped from 25.5 m³/h to 356.8 m³/h over 10 step increases, where the flow rate was maintained for one minute at each new step increase. Each step increase was in a range of about 8 to 68 m³/h. Next, an air stream containing soot particles at a concentration of 8 mg/m³ and a flow rate of 22.5 m³/h is introduced upstream of the filter for 45 minutes. The soot is generated at ~110 nm particle size from a commercially-available propane burner. Clean filtration efficiency at 30° C. is determined by measuring the difference between a number of particulates that are introduced into the article and a number of particulates that exit the article before and after exposure to the flow conditions. After the clean filtration efficiency is measured, post-test cleanout is conducted for 6 hours.

Water Exposure Tests

Several assessment protocols for understanding the durability of the filtration articles disclosed herein were utilized. Analysis of impact of water exposure of varying intensities on honeycomb filter bodies having aerosol-deposited inorganic material is an indication of the durability of the filtration articles.

Water Soak Test

As used herein, "Water Soak Test" refers to testing an article as follows.

To simulate conditions where a vehicle exhaust pipeline has seen incoming water source in an underfloor condition, the water soak test was conducted.

An article is first measured for baseline FE/dP measurement by the clean filtration efficiency test.

Next, the article is weighed at 75° C. to determine an initial weight. The article is then placed on its side in a petri dish, skin layer side, to simulate an underfloor position of the filter in a vehicle exhaust system and soaked in a quantity of deionized water for 2 hours. After the part soaks up water to a target amount, it is dried at 75° C. until completely dry (weight goes back to as-deposited state). The target quantity of water may be premeasured. For example, nominally 300 grams of water may be used. In one or more embodiments, there is a water absorption level that can be described as a percentage of a distance along a diameter of the article face the water absorbed, e.g., ½ to ¾ of a filter diameter. The article is then dried in a furnace for 5-6 hours at 100° C. until the initial weight is achieved. Next, clean filtration efficiency is measured. For evaluating clean filtration efficiency, an air stream containing soot particles at a concentration of 8 mg/m$^3$ and a flow rate of 22.5 m$^3$/h is introduced upstream of the filter for 45 minutes. The soot is generated at ~110 nm particle size from a commercially-available propane burner. Clean filtration efficiency at 30° C. is determined by measuring the difference between a number of particulates that are introduced into the article and a number of particulates that exit the article. After the filtration efficiency is measured, post-test cleanout is conducted for 6 hours. Filtration efficiency at 0 g/L soot is compared before and after the article is exposed to the water soak test.

Water Immersion Test

Another method for evaluating durability of a filtration article is the water immersion test, where a part is completely soaked in water to imitate the worst case scenario where an exhaust pipeline is submerged in water.

As used herein, "Water Immersion Test" refers to testing an article as follows.

An article is first measured for baseline FE/dP measurement by the clean filtration efficiency test.

Next, the article is weighed at 75° C. to determine an initial weight. The article with inlet end face down is slowly immersed into a vessel of water over a duration of time. The quantity of water depends on the size of the article in order to fully immerse the article. The sample remains still in the water for 1 minute and then is slowly removed from the water and allowed to sit for 2 hours. The article is weighed. Then the filter is dried in a furnace for 5-6 hours at 100° C. until the initial weight is achieved. Another clean filtration efficiency measurement is conducted to evaluate the filtration efficiency change after exposure to water.

Water Nebulizer Test

As used herein, "Water Nebulizer Test" refers to testing an article as follows. The article is placed in a can which contains a bladder. The bladder is inflated with air to hold the filter in place. Next, clean pressure drop is measured across the filter using a differential pressure sensor/gauge at room temperature (about 25° C.). The flow rate of the exhaust gas upstream from the assembly is ramped from 25.5 Nm$^3$/h to 356.8 Nm$^3$/h over 10 step increases, where the flow rate was maintained for one minute at each new step increase. Each step increase is in a range of about 8-68 Nm$^3$/h. Next, filtration efficiency is measured at 30° C., with the exhaust flow rate at 21 Nm$^3$/h and 120 nm median particle diameter soot particles at a concentration of 8.5 mg/m$^3$ introduced upstream of the filter using a propane burner for 45 minutes. Particle mass and particle number is measured upstream and downstream of the filter using a AVL microsoot sensor and TSI Engine Exhaust Particle Sizer (EEPS), respectively. After the filtration efficiency is measured, the article is removed from the can and placed in an oven at 650° C. and held at 650° C. for 9 hours so that the soot that was loaded into the article was burned out of the honeycomb.

The article is weighed at room temperature. The article is exposed to a fine mist or spray of water using a nebulizer or atomizer as described in U.S. Pat. No. 7,520,918 until the part is exposed to 15 g/L of water. Next the article is dried in an oven using 250° C. for 3 hours. Then, the article and can assembly are tested for filtration efficiency at 21 Nm$^3$/hr at 30° C. and 8.5 mg/m$^3$ and the filtration efficiency at 0 g/L soot is compared to that measured before the 650° C. heat treatment and nebulizer water exposure. Then, a cleanout procedure is performed on the article in an oven at 650° C. for 12 hours. The filter is then removed from the can and exposed to a fine mist or spray of water using a nebulizer or atomizer as described in U.S. Pat. No. 7,520,918 until the part was exposed to 15 g/L of water. Next the article is dried in an oven using 650° C. for 9 hours. Then, the article and can assembly are tested for filtration efficiency at 21 Nm$^3$/hr at 30° C. and 8.5 mg/m$^3$. Filtration efficiency at 0 g/L soot measured after the second nebulizer water exposure is compared to the baseline filtration efficiency at 0 g/L soot prior to the first 650° C. heat treatment and nebulizer water exposure.

High Flow Test

As used herein, "High Flow Test" refers to testing an article as follows.

An article is first measured for baseline FE/dP measurement by the clean filtration efficiency test.

Thereafter, high flow is introduced to the article. The flow rate of the exhaust gas upstream from the assembly is ramped from 85 m$^3$/h to 850.8 m$^3$/h over 10 step increases at about 25° C., where the flow rate was maintained for one minute at each new step increase. Each step increase was in a range of about 85-170 m$^3$/h. Next, an air stream containing soot particles at a concentration of 8 mg/m$^3$ and a flow rate of 22.5 m$^3$/h is introduced upstream of the filter for 45 minutes. The soot is generated at –110 nm particle size from a commercially-available propane burner. Clean filtration efficiency at 30° C. is determined by measuring the difference between a number of particulates that are introduced into the article and a number of particulates that exit the article before and after exposure to the flow conditions. After the filtration efficiency is measured, post-test cleanout is conducted for 6 hours. Filtration efficiency at 0 g/L soot is compared before and after the article is exposed to the high flow test.

Soot Loaded Pressure Drop Test

After pre-test canning for 6 hours, soot is loaded into the article with a flow rate of an exhaust gas upstream from the assembly ramped from 25.5 m$^3$/h to 356.8 m$^3$/h over 10 step increases at about 25° C., where the flow rate was maintained for one minute at each new step increase. Each step increase was in a range of about 8-68 m$^3$/h. Soot loading was increased from 0 g/L to 3 g/L. A soot loaded pressure drop is measured across the filter using a differential pressure sensor/gauge at room temperature (about 25° C.) after the filter is loaded with soot. After the soot loaded pressure drop was measured, post-test cleanout is conducted for 6 hours.

Cold Vibration Test

An article is placed on a shaker table which vibrates in 2 directions and is vibrated at 706 m/s$^2$, 200 Hz for 2 hours along the longitudinal and cross-sectional axis.

Vehicle Test

A canned article is installed on a vehicle which is driven on the highway simulating acceleration followed by a "fuel cut," or reduction in speed. The article experiences short pulses of high temperature and high flow rate 5 times targeting 1000 m³/h for 30 seconds or more.

Aqueous Example 1 (Aqueous Example)

The overall process flow f included three main steps: 1) raw material batching process, 2) spray-drying process and agglomerates aerosol deposition process; 3) binder curing process. In this Example, the diameter and length of the wall-flow filter substrates used in the examples were 4.055" and 5.47". The CPSI and wall thickness were 200 and 8 mils. The pore size was 14 microns.

An aqueous mixture comprising Altamis A100 raw alumina power (primary particle size diameter D50 of 0.7 μm was mixed with deionized water and ultrasonic milled at 1000 rpm for 6 hours to provide a particle mixture having a particle size diameter of approximately 0.38 μm with 30-40 wt % solids loading. A mixture was made with 3.3 wt % Z-6040 adhesion promoter, 1 wt % PEG 400, and 1.65 wt % alkoxy-siloxane resin binder, which as mixed with a magnetic stirrer for 10 minutes. This mixture was mixed with deionized water and acetic acid to result in deionized water and 0.5 wt % acetic acid to form an aqueous vehicle which included binder and adhesion promoter. The particle mixture was mixed with the aqueous vehicle including binder and adhesion promoter to provide a final suspension of particles having 11 wt % solids loading.

A two-phase fluid nozzle was used to atomize the solution. The atomizing gas was nitrogen at 91.5 psi, and the liquid atomizing speed was 18 ml/min.

The droplets were dried in the deposition chamber as shown in FIG. 4. The gas flow and the droplets were heated up by the heaters placed around the chamber. The setting temperatures was 120° C. and 120° C. for the heat sources 906a, 906b and 906c as shown in FIG. 4.

The flow was driven by a fan at 2518 RPM. The total flow rate was 11 Nm³/h. Additional air was sucked in the system to make up the total flow required. The final Al₂O₃ loading was 4.4 g/part. After deposition, the parts were cured at 200° C. for one hour. Curing with an alkali-free binder in an aqueous process was only 200° C. for 1 h and no further high temperature heat treatment was needed for curing.

Next, 300 nm median cigarette smoke particulate was used to measure the filtration efficiency. The upstream concentrations were 500,000 particles over 30 seconds which is equal to approximately 353 particles/cc with a 0.1 cfm flow rate into a Lighthouse Handheld 3016 particle counter. The particle number was collected for 30 seconds upstream and 30 seconds downstream. The total test was completed in about 1-2 minutes. The air velocity was 51 m³/h. The filtration efficiency was calculated based on reduction of particulate number concentration at downstream. The pressure drop was measured at the same flow rate by differential pressure gauge. The filtration efficiency was above 92% and the clean pressure drop average for five samples was 3.79 kPa for samples loaded with a range of from 5.90 g/l to 6.03 g/l. Pressure drop penalty at 357 Nm³/h of deposited samples was calculated based on a bare GPF filter. The pressure drop penalty mean value of 5 aqueous-based samples was 20.5% (STDEV was 1.3%), which was higher than that of ethanol-based sample of 12.5% in Non-Aqueous Example 2 (ethanol example). However, the pressure drop penalty of this sample still was acceptable for vehicle exhaust emission applications

Non-Aqueous Example 2 (Ethanol Example)

An ethanol-based aerosol deposition experiment was performed on the same type of wall-flow filter substrates used in Example.

150 nm Al₂O₃ of an ethanol suspension (30 wt. % solids, Beijing Dk Nano technology was diluted to 11 wt. % by ethanol). Alkoxy-siloxane resin was added as binder.

A two-phase fluid nozzle was used to atomize the solution. The atomizing gas was nitrogen at 91.5 psi, and the liquid atomizing speed was 18 ml/min.

The droplets were dried in the deposition chamber as shown in FIG. 4. The gas flow and the droplets were heated up by the heaters placed around the chamber. The setting temperatures were 350° C., 350° C. and 120° C. for the heat sources 906a, 906b and 906c as shown in FIG. 4.

The flow was driven by a fan at 2518 RPM. The total flow rate was 21.5 Nm³/h. Additional air was sucked in the system to make up the total flow required. The final Al₂O₃ loading was 4.4 g/part. After deposition, the parts were cured at 200° C. for one hour.

Next, 300 nm median cigarette smoke particulate was used to measure the filtration efficiency. The upstream concentrations were 500,000 particles over 30 seconds which is equal to approximately 353 particles/cc with a 0.1 cfm flow rate into a Lighthouse Handheld 3016 particle counter. The particle number was collected for 30 seconds upstream and 30 seconds downstream. The total test was completed in about 1-2 minutes. The air velocity was 51 m³/h. The filtration efficiency was calculated based on reduction of particulate number concentration at downstream. The pressure drop was measured at the same flow rate by differential pressure gauge. The filtration efficiency was 80% and the pressure drop was 195 Pa. Pressure drop penalty at 357 Nm³/h of deposited samples was calculated based on a bare GPF filter. The pressure drop penalty was 12.5%.

A comparison of basic performance factors (FE vs. dP and FE vs. Loading) between samples with aqueous Example 1 and ethanol Non-Aqueous Example 2 the aqueous-based samples and ethanol-based samples has a similar trade-off relationship between filtration efficiency and loading.

Figure 12:
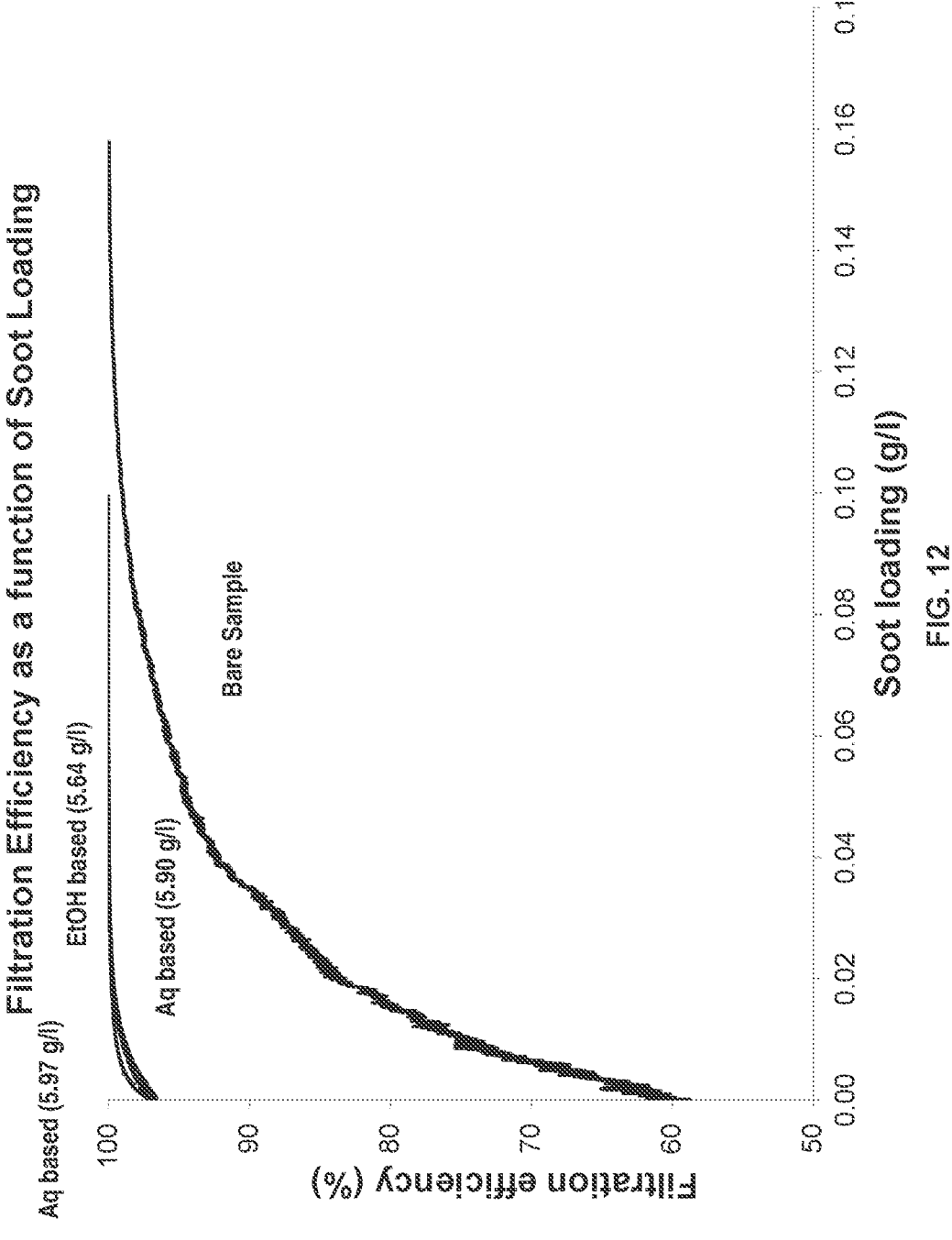
FIG. 12 is a graph of filtration efficiency versus soot loading for samples prepared in the Examples.

FIG. 12 is a graph of filtration efficiency versus soot loading for samples prepared in Aqueous Example 1 (aqueous) and Non-Aqueous Example 2 (ethanol) as well as a bare GPF. For clean filtration efficiency, the Examples were both above 96%, which was significantly higher than a bare GPF. When the soot was loaded in the samples, FE began to increase. It could be seen that the increasing rate of Aqueous Example 1 (aqueous) and Non-Aqueous Example 2 (ethanol) were much faster than that of bare sample. At the point of 0.01 g/L soot loading, FE of deposited samples were all approximately 99%, but the bare GPF was only about 75%. The FE performance of aqueous-based samples were comparable to ethanol-based samples.

Figure 13:
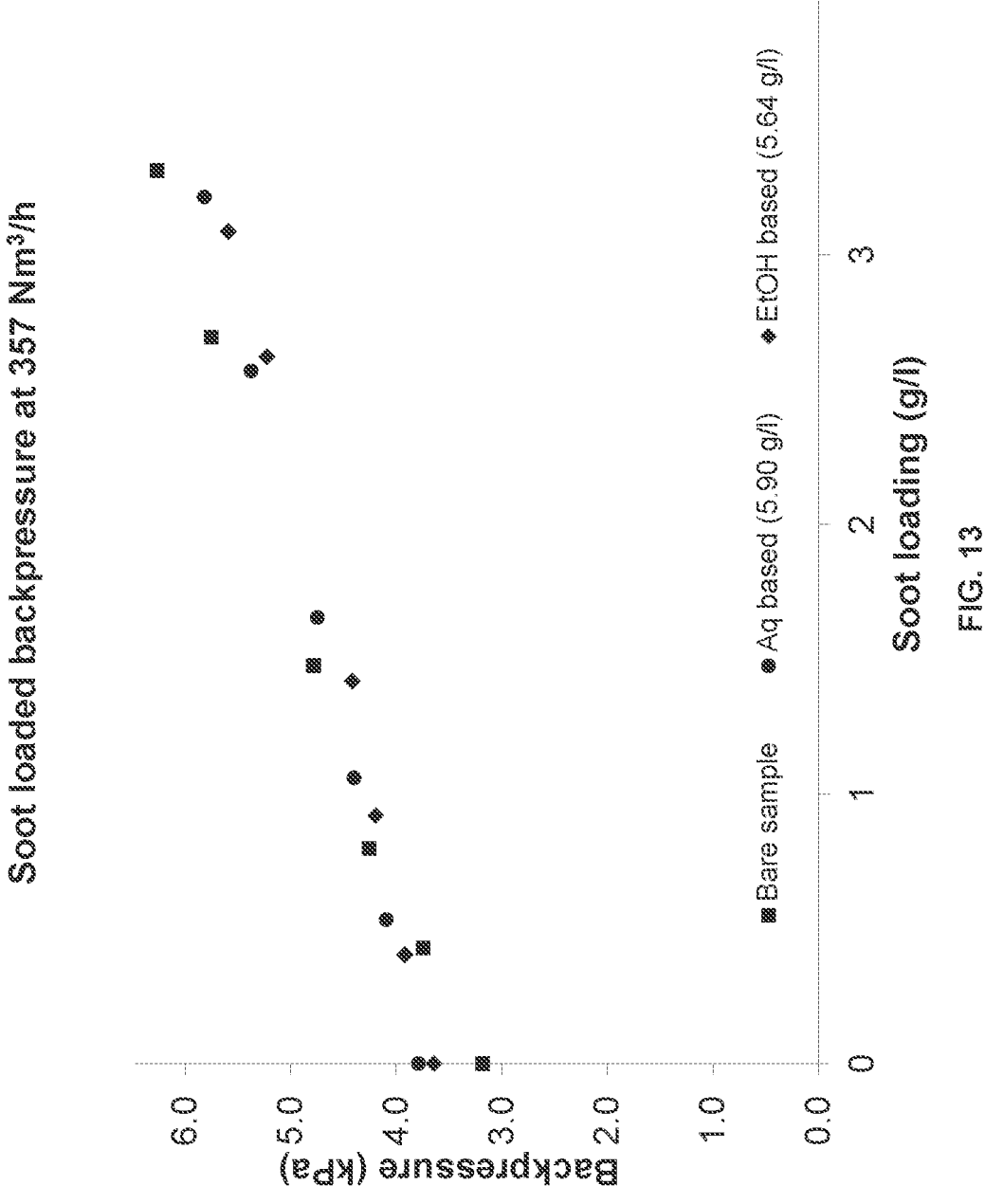
FIG. 13. Is a graph of soot-loaded backpressure versus soot loading for samples prepared in the Examples.

FIG. 13. Is a graph of soot-loaded backpressure versus soot loading for samples prepared in the Examples. Soot loaded backpressure was also measured at 357 Nm³/h. A bare GPF, an aqueous-based samples (Aqueous Example 1) and an ethanol-based sample (Non-Aqueous Example 2) were tested and compared. When the soot loading was in the range of 0~0.6 g/L, soot loaded backpressure of the bare GPF sample was lower than that of the GPF samples deposited with an inorganic layer. But the slope of the function was sharper than deposited samples. When the soot loading was more than 0.6 g/L, the soot loaded back pressure of deposited samples was lower than that of bare GPF. The aqueous samples of Aqueous Example 1 showed the same tend as ethanol samples of Non-Aqueous Example 2.

Figure 14A:
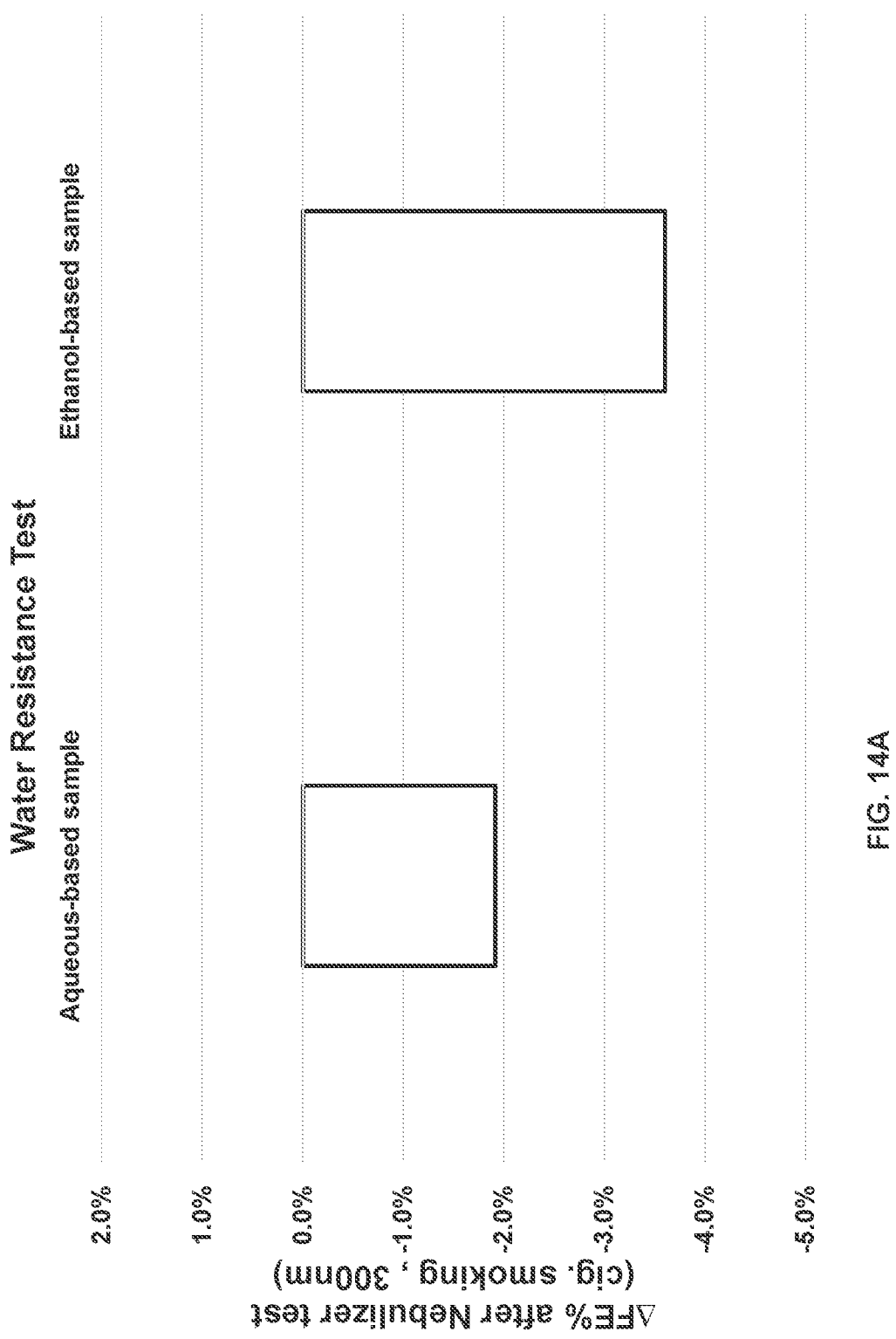
FIG. 14A is a graph of water resistance data for aqueous and ethanol-based samples.
Figure 14B:
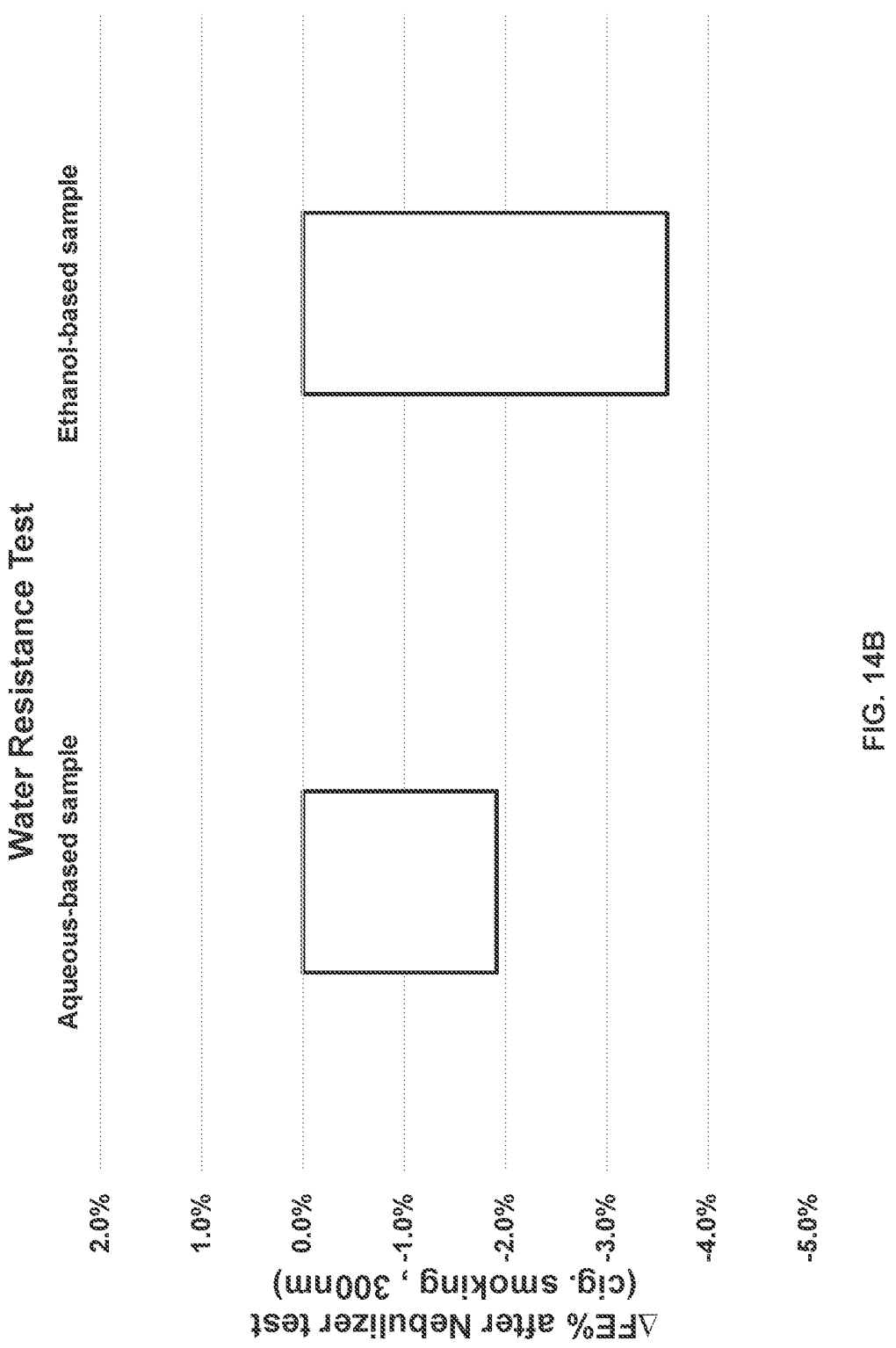
FIG. 14B is a graph of durability test results for aqueous and ethanol-based samples.

Four types of relatively harsh tests were selected to test the durability of the inorganic deposits on the samples prepared by the aqueous process of Aqueous Example 1. The as-deposited cigarette smoking FE % was 95.32% and post curing cig. smoking FE % was 95.09%. The same sample was subjected to the four durability tests in the order of high flow, cold vibration, fuel-cut vehicle test, and water resistance as tested finally by nebulizer. Three of the durability tests included a fuel-cut vehicle test (1.8 L Geely Borui, highway driving about 2 h), Cold vibration (76 g, 200 Hz, 2 h) and a high flow (850 Nm$^3$/h cold flow). The FE % drops after each test are shown in FIG. 14A. The total FE % drop after undergoing these series test is shown in this figure. The FE % drop or total FE % drop was less than 5%. The nebulizer test and the final water loading was up to 70 g of water. FE % drop after nebulizer test was about 2%. All the test results of the two processes were compared in FIG. 14B. The aqueous-based process samples of Aqueous Example 1 showed the same reliable durable inorganic layer as ethanol-based process samples of the Non-Aqueous (ethanol) Example.

Figures 15A, 15B:
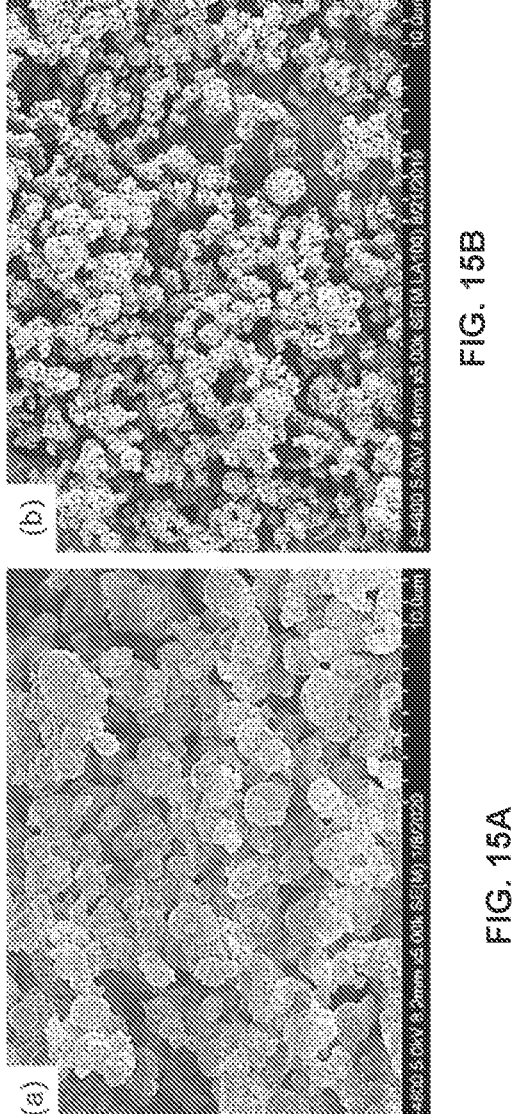
FIG. 15A is an SEM photograph showing a sample prepared according to Aqueous Example 1 (aqueous example)
FIG. 15B is an SEM photograph showing a sample prepared according to Non-Aqueous Example 2.
Figure 15D:
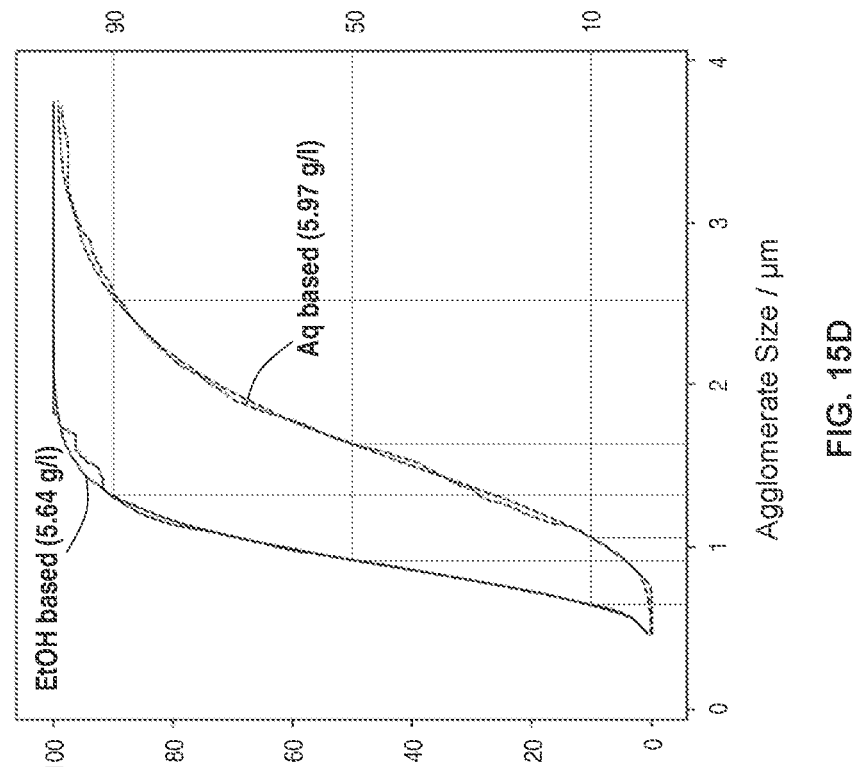
FIG. 15D is a graph showing accumulative distribution and its log normal distribution fitting for the Aqueous Example 1 (aqueous example) and Non-Aqueous Example 2 (ethanol example)
Figure 15C:
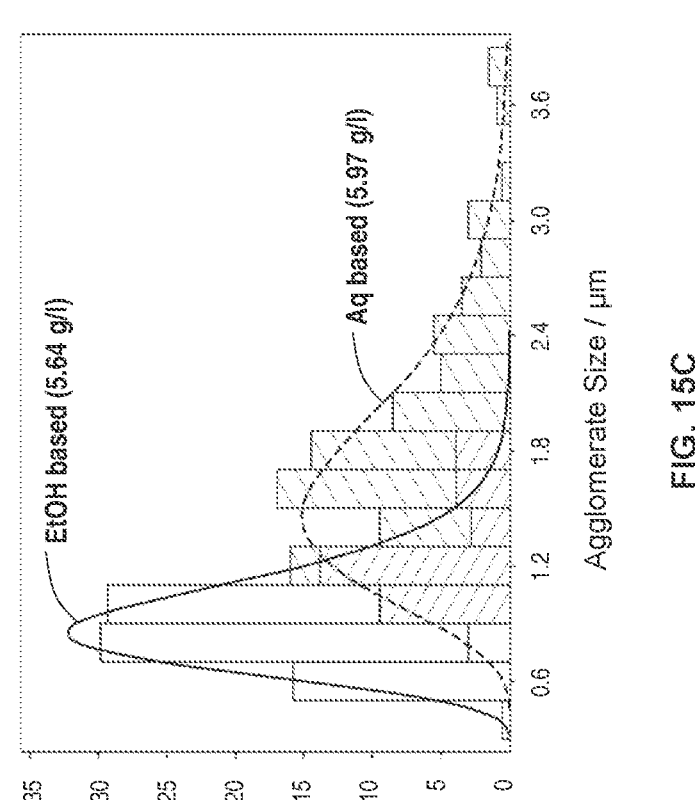
FIG. 15C is a graph of particle size distribution for the sample shown in FIG. 15A.

FIG. 15A and FIG. 15B respectively are SEM photographs showing a sample prepared according to Aqueous Example 1 (aqueous example) and Example 2 (ethanol example) showing the morphology of a deposited inorganic layer and alumina agglomerates size distribution. FIG. 15C is a graph of particle size distribution for the sample shown in FIG. 15A, showing a histogram of agglomerate size distribution basing on SEM image analysis; FIG. 15D is a graph showing accumulative distribution and its log normal distribution fitting for the two processes. As shown in FIGS. 15A and 15B, spherical agglomerates were formed during spray-drying step and deposited under the surface layer of GPF wall, which packing morphologies generated from the aqueous-based (Aqueous Example 1 (FIG. 15A)) and the ethanol-based process (Non-Aqueous Example 2 (15B)). It can be seen from the SEM images that spherical agglomerates were formed for both processes. The aqueous-based spherical agglomerate size was larger than ethanol-based spherical agglomerates, but the spherical rate of ethanol-based was higher than that of aqueous-based. A bridge or filament structure could be observed in ethanol-based packing structure, while more independent agglomerates were observed in aqueous-based packing structure. No less than 200 agglomerates diameter were measured from the SEM images for each process. The histogram statistics of all measurement diameter shown in 15C and log normal distribution of FIG. 15D was used to fit the results. Overall, the aqueous-based agglomerate size of Aqueous Example 1 (aqueous) was larger than ethanol-based agglomerate size of Non-Aqueous Example 2 (ethanol). The accumulative log normal distribution of two processes were also compared in FIG. 15D. From accumulative log normal distribution fitting results, D10, D50 and D90 of agglomerates were summarized. D50 of two process was 0.92 μm for Aqueous Example 1 (aqueous) and 1.63 μm for Non-Aqueous Example 2 (ethanol). D10 for Non-Aqueous Example 2 (ethanol) was 0.65 μm and D10 for Aqueous Example 1 (aqueous) was 1.06 μm. D90 for Non-Aqueous Example 2 (ethanol) was 1.56 μm, and 2.53 μm for Aqueous Example 1 (aqueous). The aqueous process achieves the same FE by similar agglomerate loading to ethanol process, even though its agglomerate size was 1.8 times to the agglomerate size of the ethanol process of Non-Aqueous Example 2.

Figures 16A, 16B, 16C:
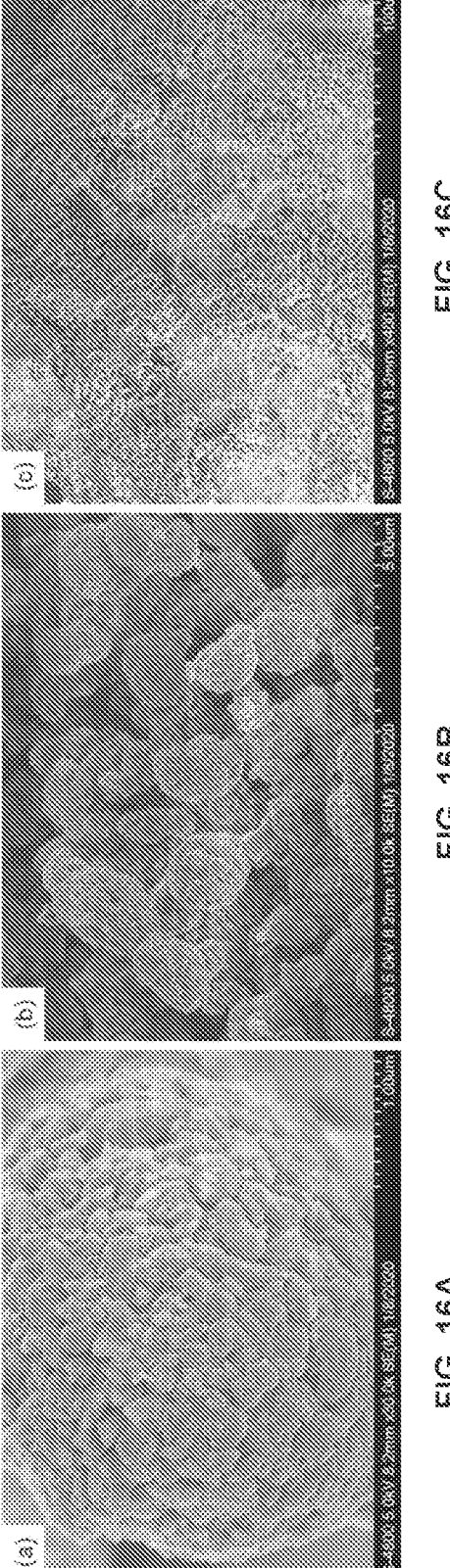
FIGS. 16A-C are SEM photographs for samples prepared according to Aqueous Example 1 (aqueous example).

FIGS. 16A-C are SEM photographs for samples prepared according to Aqueous Example 1 (aqueous). FIG. 16A is a high resolution images of alumina agglomerate, FIG. 16B shows alumina agglomerates stacking to form high FE inorganic layer, and FIG. 16C shows agglomerates stacking distribution under a GPF wall. FIG. 16A shows that the agglomerate was made up of primary alumina particles. The SEM indicated that the dispersed binder was uniformly distributed in the agglomerate, at least at primary alumina particle scale. Uniform binder uniform distribution resulted in more effective binding and make it possible to bound agglomerate to agglomerate or agglomerate to GPF wall. Agglomerate packing structure is shown in FIG. 16B. Comparing with ethanol-based agglomerate packing in FIG. 15B, the aqueous-based agglomerates seemed to be stacked denser than ethanol-based agglomerates. The denser packing structure could be one possible reason that bigger agglomerates could provide the same FE with similar loading. In FIG. 16C it can be seen that agglomerates are deposited both in the opening pores of wall and under the wall. A non-continuous inorganic layer was built up during the deposition.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for applying a surface treatment to a plugged honeycomb body comprising porous walls, the method comprising:

atomizing particles of an inorganic material into liquid-particulate-binder-adhesion promoter droplets comprised of an aqueous vehicle, an alkylalkoxysilane binder, an adhesion promoter, and the particles, the adhesion promoter comprising γ-Glycidoxypropyl) trimethoxysilane, (3-Glycidoxybutyl)trimethoxysilane, (3-Glycidoxyethyl)trimethoxysilane, or 3-Glycidoxy-Hexadecyltrimethoxysilane;

evaporating substantially all of the aqueous vehicle from the droplets to form agglomerates comprised of the particles and the binder material;

depositing the agglomerates onto the porous walls of the plugged honeycomb body; and wherein the deposited agglomerates are disposed on, or in, or both on and in, the porous walls.

2. The method of claim 1, wherein the atomizing further comprises supplying a suspension of the particles, the aqueous vehicle, and the binder and the adhesion promoter.

3. The method of claim 1, wherein at least some of the agglomerates adhere to the porous walls.

4. The method of claim 1, wherein the liquid-particulate-binder-adhesion promoter droplets further comprise a polyethylene glycol dispersant.

5. The method of claim 1, wherein the particles are mixed with the aqueous vehicle and the binder and the adhesion promoter to form a liquid-particulate-binder-adhesion promoter stream, and the liquid-particulate-binder-adhesion promoter stream is directed into an atomizing nozzle.

6. The method of claim 5, further comprising aerosolizing the liquid-particulate-binder-adhesion promoter droplets, wherein the liquid-particulate-binder-adhesion promoter stream mixes with an atomizing gas via the atomizing nozzle.

7. The method of claim 6, wherein the atomizing nozzle is cooled during the aerosolizing.

8. The method of claim 6, wherein the droplets are aerosolized and conveyed toward the plugged honeycomb body by a gaseous carrier stream comprising the atomizing gas and a carrier gas, wherein the gaseous carrier stream is heated prior to being mixed with the droplets.

9. The method of claim 8, wherein the gaseous carrier stream is heated to a temperature in a range from greater than or equal to 50° C. to less than or equal to 500° C.

10. The method of claim 8, wherein the droplets and the gaseous carrier stream are conveyed through a duct having an outlet end proximate the plugged honeycomb body, wherein the duct is substantially adiabatic and is in sealed fluid communication with the plugged honeycomb body during the depositing step.

11. The method of claim 10, wherein a total volumetric flow through the duct is greater than or equal to 5 Nm³/hour and/or less than or equal to 200 Nm³/hour.

12. The method of claim 10, wherein the duct comprises an evaporation section having an axial length configured to allow evaporation of a substantial portion or all of the aqueous vehicle from the agglomerates.

13. The method of claim 10, wherein the carrier gas is delivered to a chamber of the duct in an annular flow surrounding the nozzle in a co-flow around the droplets at the end of the nozzle.

14. The method of claim 10, wherein the duct comprises a diffusing area downstream of the nozzle.

15. The method of claim 10, wherein the duct comprises a converging section for engaging a proximal end of the honeycomb body.

16. The method of claim 8, wherein the carrier gas is nitrogen.

17. The method of claim 8, wherein the carrier gas consists essentially of an inert gas.

18. The method of claim 8, wherein the carrier gas is predominantly air.

19. The method of claim 8, wherein the carrier gas comprises less than 5 weight percent water vapor.

20. The method of claim 1, wherein the plugged honeycomb body comprises inlet channels which are plugged at a distal end of the honeycomb body, and outlet channels which are plugged at a proximal end of the honeycomb body.

21. The method of claim 20, wherein the agglomerates are deposited on the walls defining the inlet channels.

22. The method of claim 1, wherein the agglomerates comprise a particle size of d50 greater than 0.5 microns and less than 5 microns, d90 greater than 1 microns and less than 5 microns, and d10 greater than 0.3 microns and less than 2 microns.

23. The method of claim 1, wherein an average size of the liquid-particulate-droplets is greater than or equal to 1 μm and less than or equal to 15 μm.

* * * * *